United States Patent [19]

Albrecht et al.

[11] Patent Number: 5,438,571
[45] Date of Patent: Aug. 1, 1995

[54] HIGH SPEED DATA TRANSFER OVER TWISTED PAIR CABLING

[75] Inventors: Alan Albrecht, Granite Bay; Steven H. Goody, Roseville, both of Calif.; Michael P. Spratt, Bath, England; Joseph A. Curcio, Jr., Folsom; Daniel J. Dove, Applegate, both of Calif.; Jonathan Jedwab, Clifton; Simon E. Crouch, Nr. Chippenham, both of England

[73] Assignee: Hewlett-Packard Company, Palo Alto, Calif.

[21] Appl. No.: 246,536

[22] Filed: May 20, 1994

Related U.S. Application Data

[63] Continuation-in-part of Ser. No. 972,694, Nov. 6, 1992.

[51] Int. Cl.[6] .............................................. H04L 12/44
[52] U.S. Cl. .................................. 370/94.3; 370/85.9; 371/37.1
[58] Field of Search ................ 370/94.3, 85.1, 85.2, 370/85.3, 85.7, 85.9, 85.11, 84, 110.1, 17, 77; 375/36, 38; 371/37.1–37.9, 52; 341/73, 100, 101

[56] References Cited

U.S. PATENT DOCUMENTS

| | | | |
|---|---|---|---|
| 4,755,987 | 7/1988 | Lee et al. | 370/77 |
| 5,079,766 | 1/1992 | Richard et al. | 370/85.3 |
| 5,144,305 | 9/1992 | Gotz et al. | 370/110.1 |

Primary Examiner—Wellington Chin
Assistant Examiner—Huy D. Vu
Attorney, Agent, or Firm—Douglas M. Gilbert

[57] ABSTRACT

A method for transmitting data packets, grouped as data octets, over a LAN having a central hub linked to each of a plurality of network nodes via a physical medium consisting of four pairs of unshielded twisted pair (UTP) cable. The transmission method sequentially divides the data into data quintets. The quintets are then arranged into blocks of data quintets and sequentially distributed into four individual serial code streams. The four serial code streams are sequentially scrambled to produce four streams of randomized quintets. The randomized data streams are sequentially block encoded into 6-bit symbol data which are then transmitted using NRZ modulation across the network by transmitting each data stream over one of said pairs of cable.

10 Claims, 22 Drawing Sheets

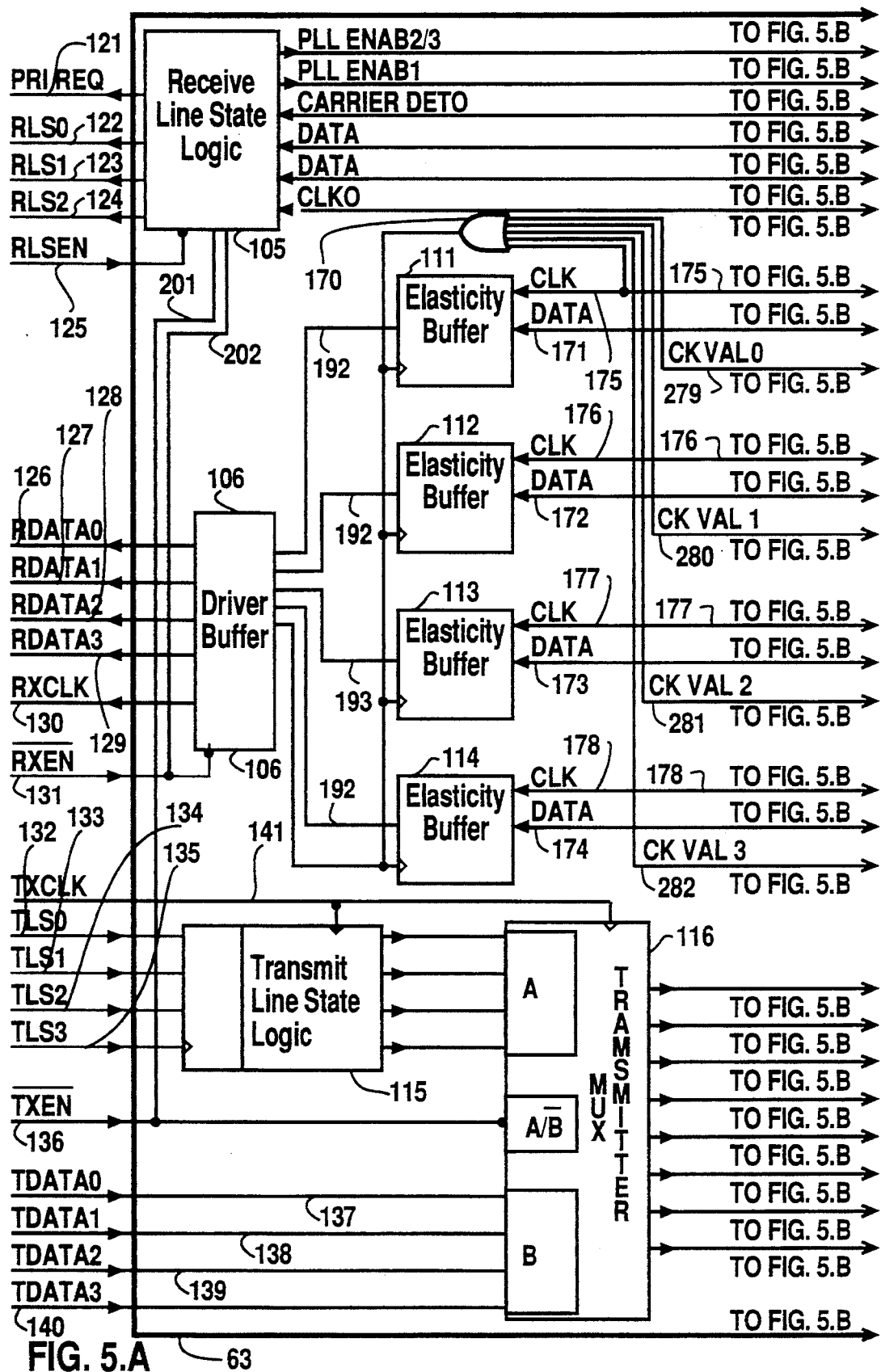
FIG. 5.A

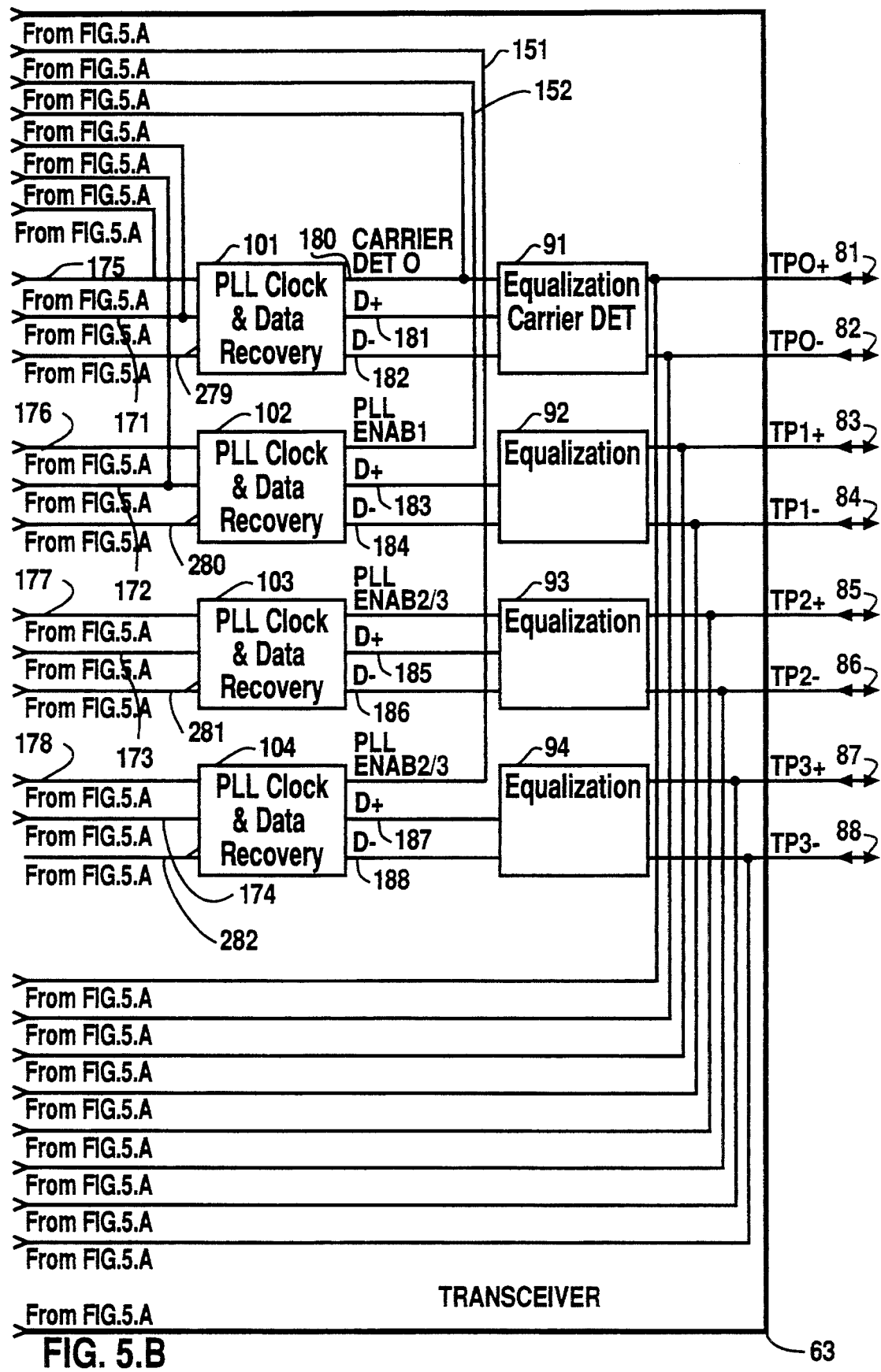
FIG. 5.B

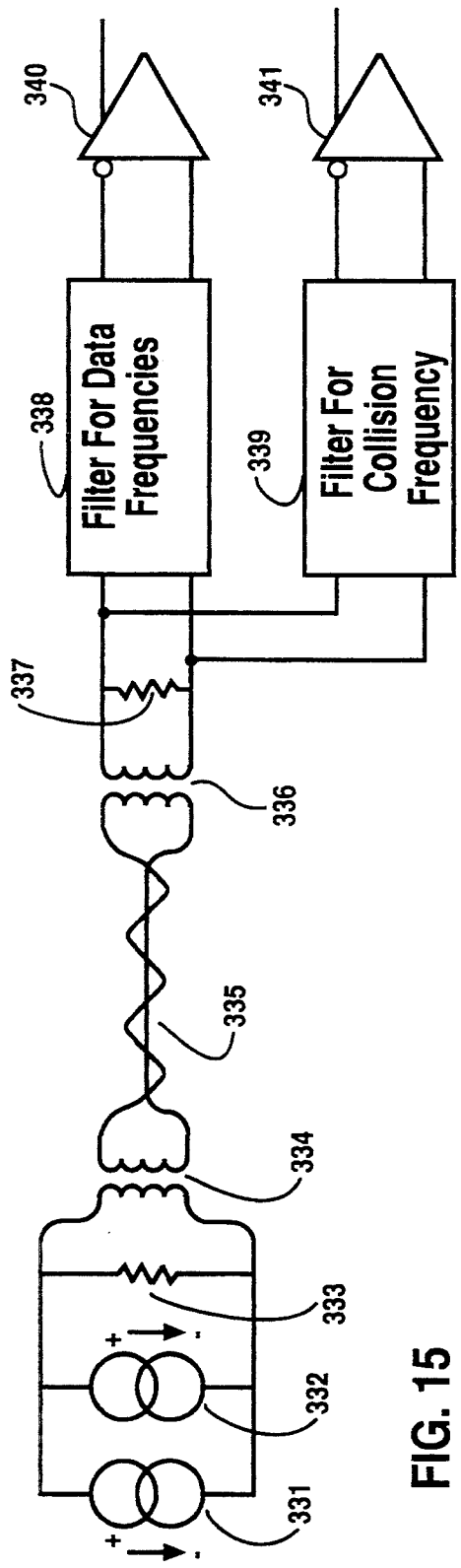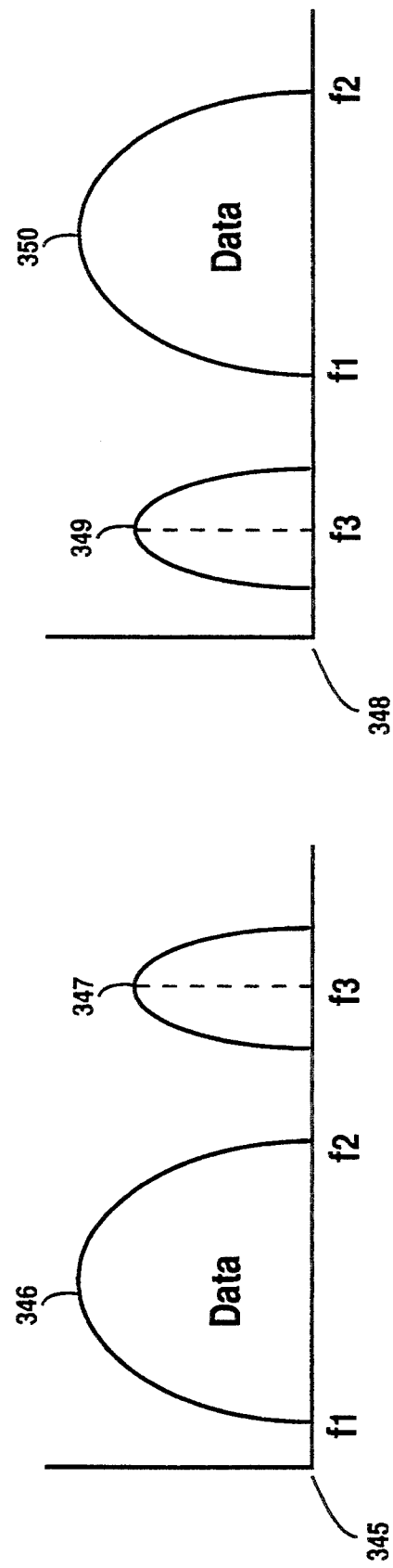

HIGH SPEED DATA TRANSFER OVER TWISTED PAIR CABLING

CROSS REFERENCE TO RELATED APPLICATION

This is a continuation-in-part of patent application Ser. No. 07/972,694, (now pending) entitled "High Speed Data Transfer Over Twisted Pair Cabling," and filed on Nov. 6, 1992.

BACKGROUND

The present invention pertains to computer networks, and more particularly, to a method of transferring data at 100 Mb/s transfer rates over local area networks (LAN's) using unshielded twisted pair (UTP) wire media.

In the world of computers, pc and workstation users are requiring greater network bandwidths/higher speeds to carry more and more data over existing networks. The need for higher speed networks will grow even faster as desktop computers are equipped with the higher speed bus architectures that are being developed. Over the past ten years, desktop pc processing power has increased over a hundredfold. Over that same period, however, the data transmission speed of Ethernet LAN's has remained constant at 10 Mb/s. Network speeds are now a common bottleneck in a variety of key business application areas including database management, imaging, computer-aided design and network printing. On a typical 10 Mb/s Ethernet or Token-Ring network, it can take as long as 20 seconds to retrieve a single page of data depending upon network traffic. If 100 Mb/s networks were available, transfers would not be network limited and would take only one or two seconds for that same page of data.

Generally, for high speed data transfer in excess of 25 Mb/s over a LAN, data has been transferred using fiber optic media, coaxial cable, shielded wire or other specialized cable. For example, the fiber distributed data interface (FDDI) protocol is a common network protocol which operates using a fiber optic medium. FDDI has been available the longest of any high speed (100 Mb/s) network architecture, but it is still the costliest. Very few business users of computers have installed fiber optic cabling. In the United States it is estimated that approximately 80% of existing LAN users have "category 3" (voice grade) unshielded twisted pair wiring to interconnect desktop users. Such cables are usually configured in 25-pair bundles to accommodate future organizational growth.

The use of fiber optic media or shielded twisted pair (STP) wire for local area networking present various problems of their own. Most existing office buildings have an installed base of UTP wiring—not fiber optic cable or STP wire. Therefore, to utilize a fiber optic or STP network, assuming existing cable ducts have the space available, it would be necessary to specially install high quality cabling. This can be cost prohibitive. Yet if a LAN could be designed to operate at speeds of 100 Mb/s and work over Category 3 to Category 5 (data grade) UTP wire, users could easily switch to the higher speed network interface equipment using the existing cabling installation.

There has been some work done to increase the rate over which data can be transferred over installed twisted pair cabling. See for example U.S. Pat. No. 5,119,402 issued to Simon A. Ginzburg et al. for a *Method and Apparatus for Transmission of Local Area Network Signals over Unshielded Twisted Pairs.* However, in the prior art there has been no work which has sufficiently increased the speed of data transmission so that transmission over a four pair voice grade UTP wire network can rival the speed of data transmissions over fiber optic cabling. Some of the reasons for this are obvious. Unlike fiber optic cable or STP wire, UTP wire has greater radio-frequency (rf) emissions since it is unshielded. And, because the twist of the wire pairs does not provide perfect balance, there are also crosstalk and noise interference problems. And as speeds increase above 10 Mb/s these problems are exacerbated along with high frequency rolloff causing signal distortion that increases with the length of the wire runs. Yet, given these problems there are various proposals for new network topologies to send data over UTP wire at transmission rates of 100 Mb/s; the present invention represents the heart of one of those proposals. And, although the present invention could easily be adapted to operate over higher quality cable, such as STP, it has its greatest utility (in terms of economy) for existing UTP wired facilities.

SUMMARY OF THE INVENTION

In accordance with the teachings of the present invention, a method is provided for transmitting data packets, grouped as data octets, over a LAN having a central hub linked to each of a plurality of network nodes via a physical medium consisting of four pairs of unshielded twisted pair (UTP) cable. The transmission method initially divides the data octets sequentially into 5-bit data quintets. The quintets are then sequentially distributed into four individual serial code streams. The four serial code streams are sequentially scrambled to produce four streams of randomized 5-bit quintets. The randomized data streams are sequentially block encoded into 6-bit symbol data which are then transmitted across the network by transmitting each data stream over one of said pairs of cable.

In the preferred embodiment, before the 6-bit symbol data is transmitted across the network, the data on two of the cable pairs is staggered (in time) by at least two data bits for various reasons including to increase the noise immunity of the transmission across the channel.

BRIEF DESCRIPTION OF THE DRAWINGS

For a better understanding of the invention as well as further features thereof, reference is made to the accompanying drawings wherein:

FIG. 5, 5A and 5B show a simplified block diagram of a transceiver within the hub shown in FIG. 4.

FIG. 15 is a block diagram of a circuit which facilitates collision detection in a network in accordance with a preferred embodiment of the present invention.

FIGS. 16 and 17 show potential frequency spectrums for signals sent across a twisted pair shown in FIG. 15.

DETAILED DESCRIPTION

Figure 1:
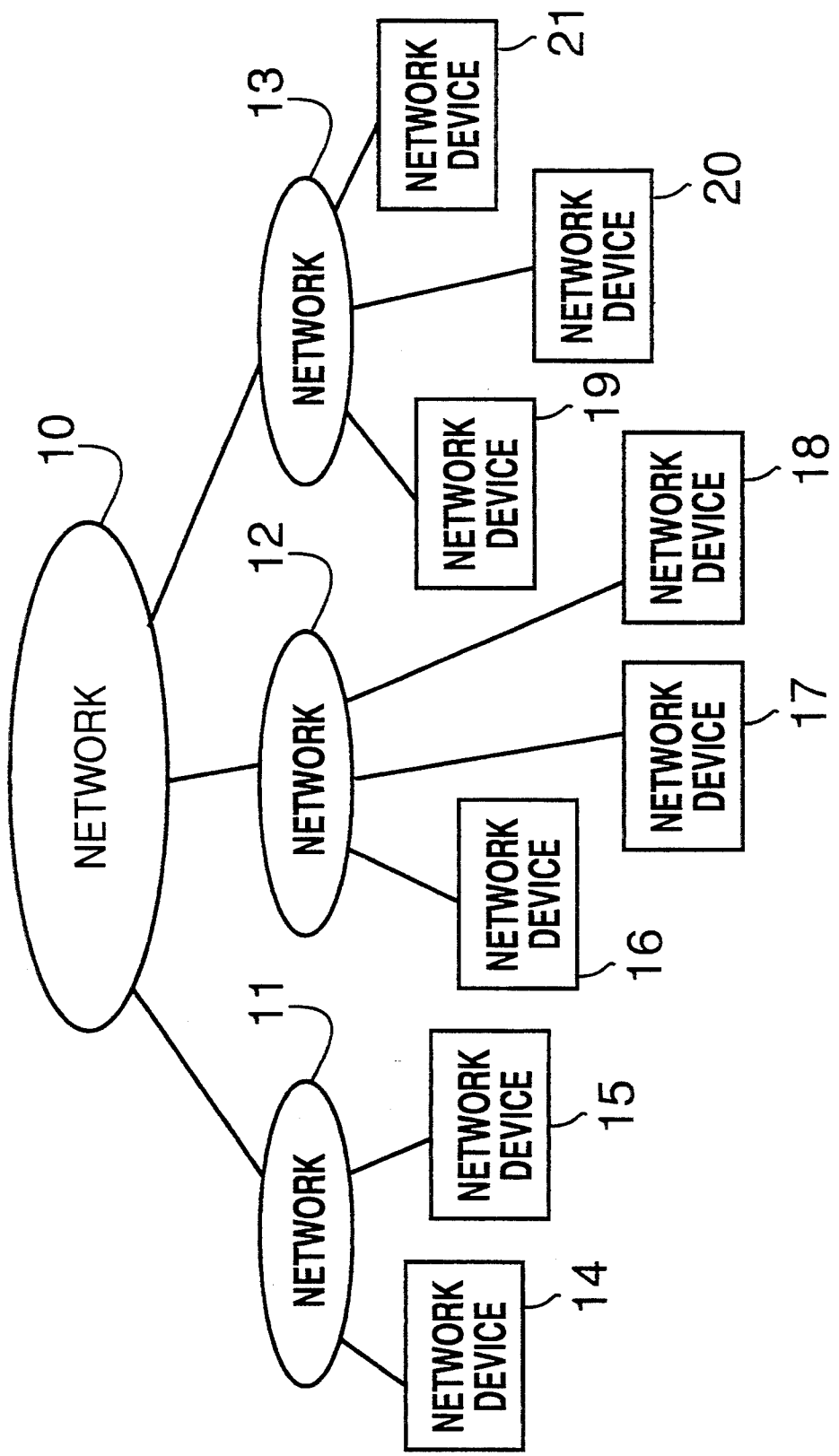
FIG. 1 shows a simplified block diagram of the interconnection of various networks.

FIG. 1 shows a simplified block diagram of a typical network structure. A LAN 11, a LAN 12 and a LAN 13 are connected, for example, through a bridge/router (not shown in FIG. 1) to network 10. Network 10 operates, for example, using the fiber distributed data interface (FDDI) protocol. LAN 11 and LAN 13, may operate, in accordance with any number of protocols. For example, if connected through a router, these LANs could operate in accordance with the IEEE 802.3 protocol, with the Token Ring protocol, with ISDN protocol or with a WAN protocol.

Various network devices, also referred to as end nodes, may be connected to the LANs. For example, a network device 14 and a network device 15 are shown connected to LAN 11. Network devices 16, 17 and 18 are shown connected to LAN 12. Network devices 19, 20 and 21 are shown connected to LAN 13. Network devices 14 through 21 may be, for example, a work station, a personal computer, a network server, or some other device.

Figure 2:
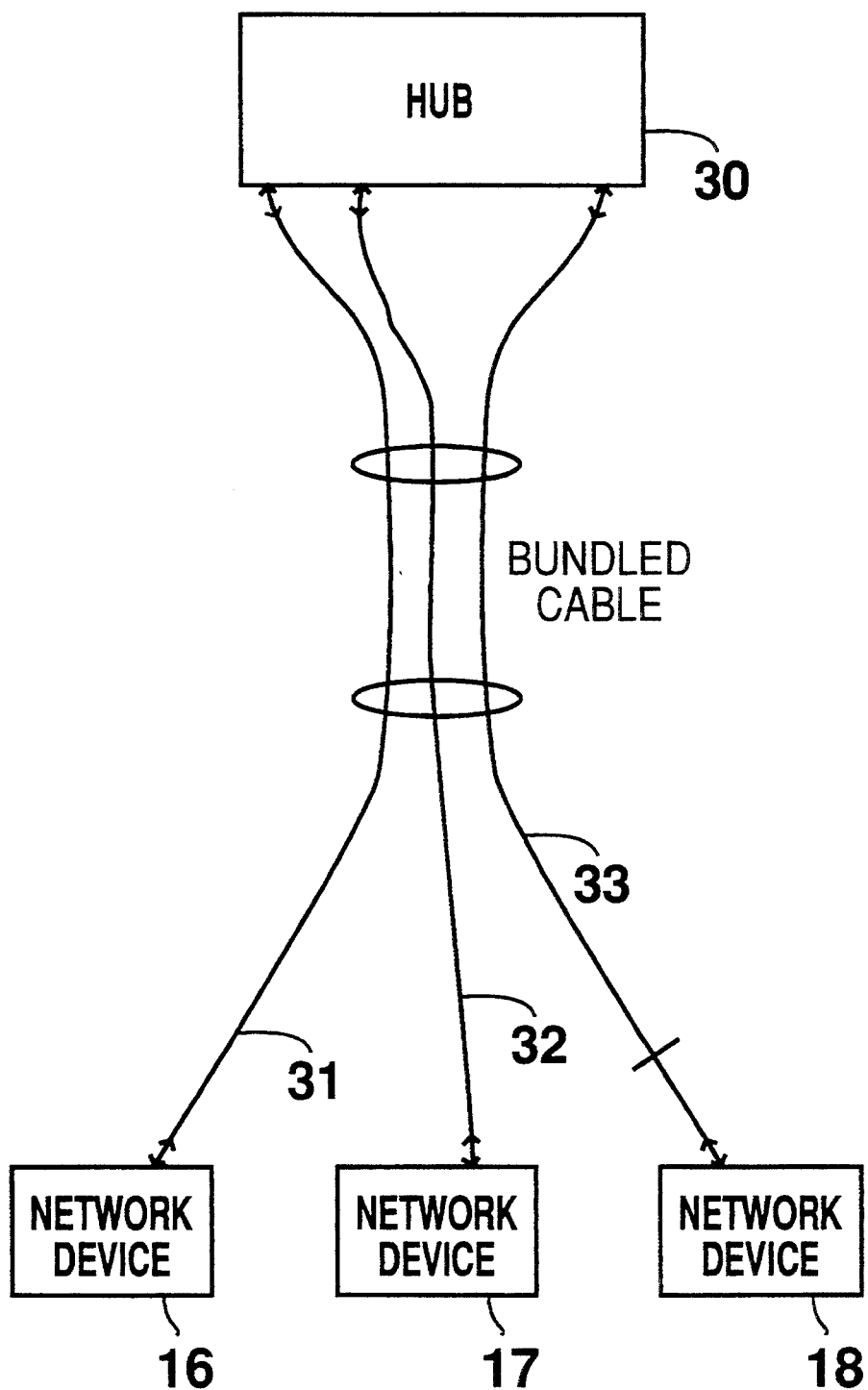
FIG. 2 shows a simplified block diagram of a network in accordance with a preferred embodiment of the present invention.

FIG. 2 shows a block diagram of LAN 12 which includes a hub 30. Hub 30 is an intelligent central controller that manages data from the various network devices connected to the hub. Hub 30 is connected to network device 16 through four twisted pairs of copper cable 31. Hub 30 is also connected to each network device 17 and 18 through four twisted pairs or copper cable 32 and 33 respectively.

Figure 3:
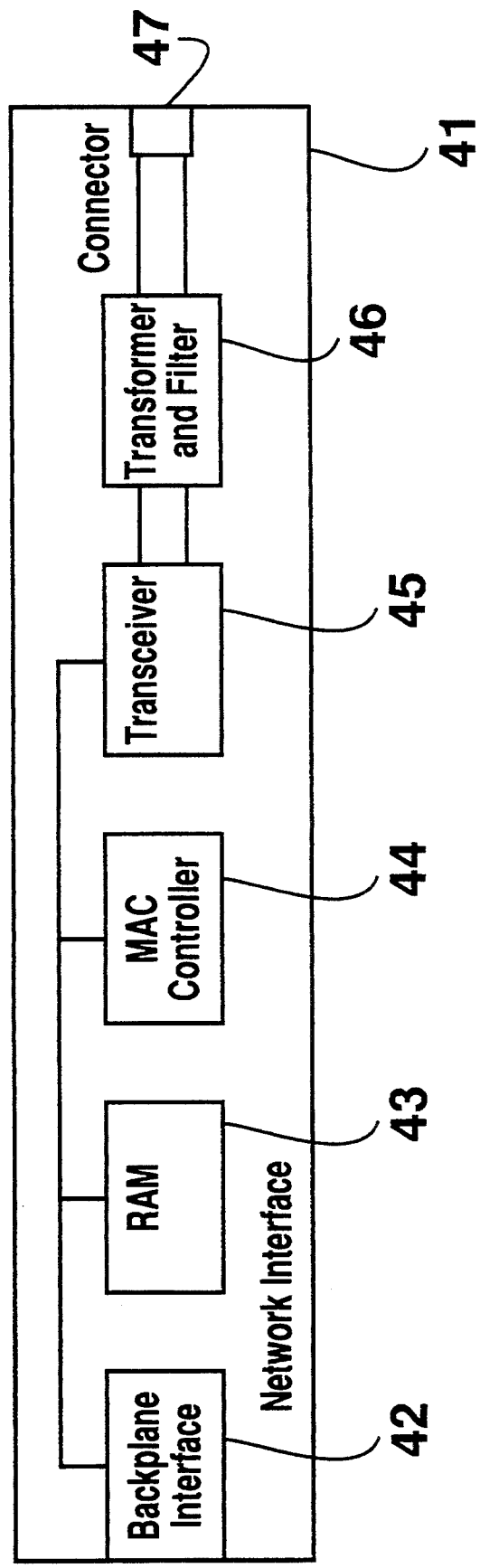
FIG. 3 shows a simplified block diagram of a network device of the network shown in FIG. 2.

FIG. 3 shows a simplified block diagram of a network interface 41, which is used by each of network devices 16, 17 and 18 to interface with hub 30. A backplane interface 42 provides an interface between computer system RAM and the network device. A random access memory (RAM) 43 is used to temporarily store data packets received from or to be transferred out on the network. A media access controller (MAC) 44 is used to control the flow of data within network interface 41. A transceiver 45 is used to send and receive through the network. A transformer and filter 46 is used to adjust voltage and provide noise filtering for signals transferred between transceiver 45 and a connector 47. A connector 47 is connected to the bundle of four UTP wires from hub 30.

Figure 3A:
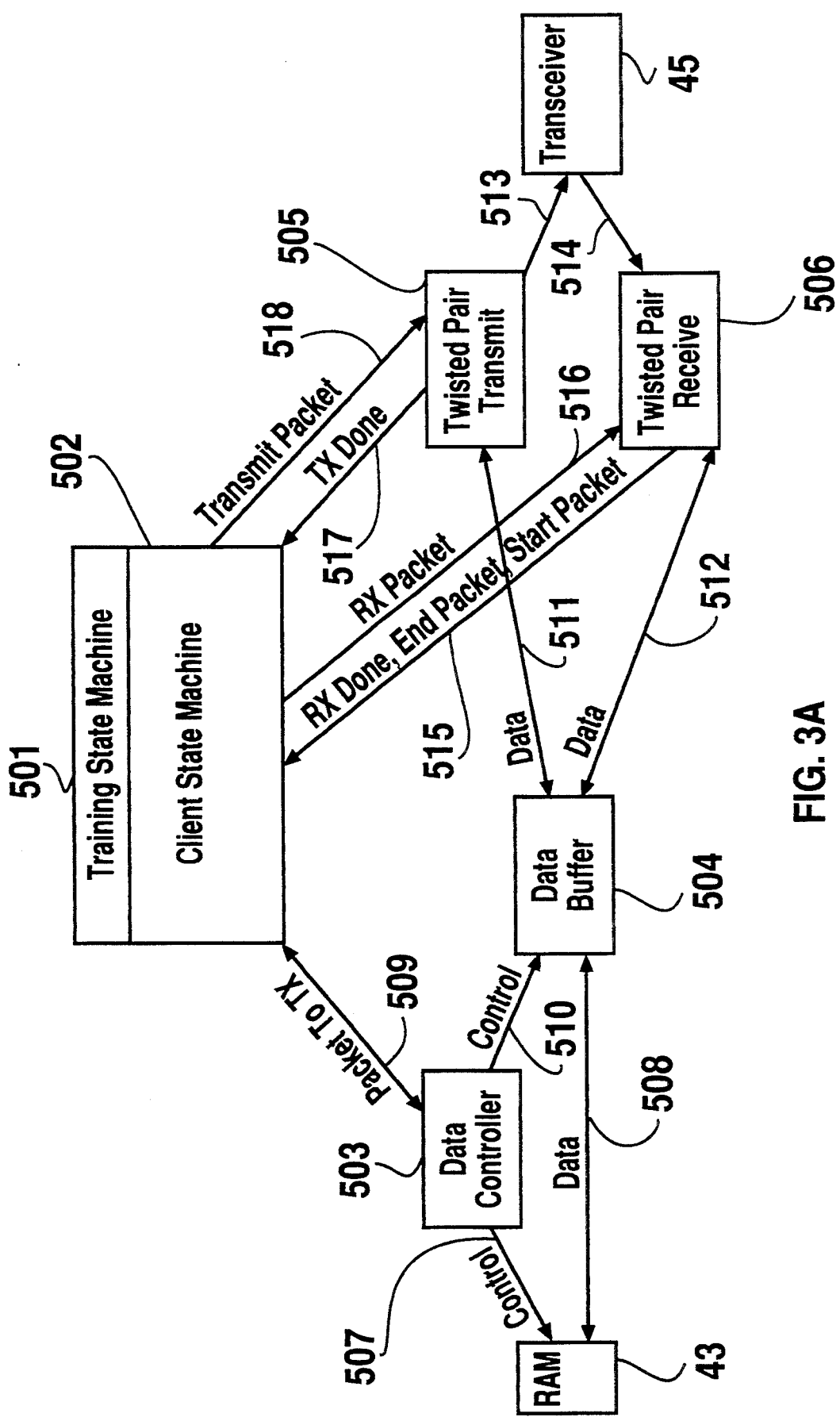
FIG. 3A is a block diagram which shows logical flow of information within the network device shown in FIG. 3.

FIG. 3A is a block diagram which shows logical flow of information within network interface (client) 41. A client-training-state machine 501 is used in initializing the connection between network device 41 and hub 30. (Although the function is explained below in greater detail, "training" is the initialization process that verifies the operation of the link and optimizes the circuitry for data transmission and reception.) A client-state machine 502 controls data transactions between network device 41 and hub 30. A DMA controller 503 controls DMA transfers between RAM 43 and a data buffer 504. Twisted pair transmit logic 505 forwards data to transceiver 45 via path 513. Twisted pair receive logic 506 receives data from transceiver 45 via path 514.

Control signals flow from DMA controller 503 to RAM 43 through an information channel 507. Control signals also flow from DMA controller 503 to data buffer 504 through another information channel 510. Data signals flow between data buffer 504 and RAM 43 through another information channel 508. DMA controller 503 signals client-state machine 502 through information channel 509 when there is a packet to transmit. Data buffer 504 sends data to twisted pair transmit logic 505 through information channel 511. Data buffer 504 receives data signals from twisted pair receive logic 506 through information channel 512. Transceiver 45 receives data from twisted pair transmit logic 505 through information channel 513. Transceiver 45 also sends data to twisted pair receive logic 506 through information channel 514. Twisted pair receive logic 506 signals client-state machine 502 through an information channel 515 at the start of a packet and at the end of a packet (RXDONE). Client-state machine 502 signals twisted pair receive logic 506 through an information channel 516 when a packet is to be received. Twisted pair transmit logic 505 signals client-state machine 502 through an information channel 517 when a transmit is complete. Client-state machine 502 signals twisted-pair-transmit logic 505 through an information channel 518 when a packet is to be transmitted.

Figure 4:
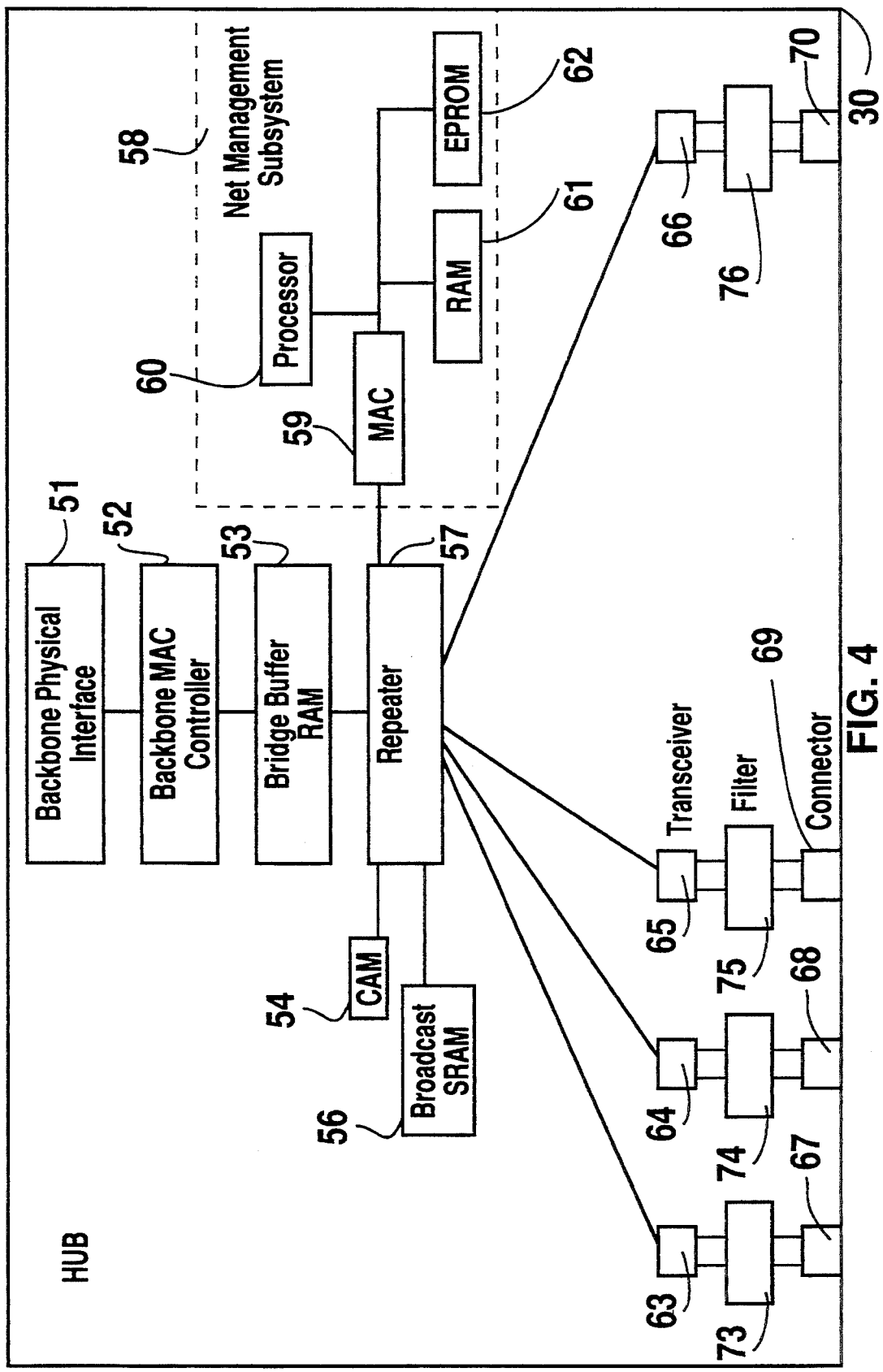
FIG. 4 shows a simplified block diagram of the hub of the network shown in FIG. 2.

FIG. 4 shows a block diagram of hub 30 which manages the network access. A backbone physical interface 51 provides a physical interface of hub 30 to network 10. A backbone media access controller (MAC) 52 controls data flow between hub 30 and network 10. A bridge buffer RAM 53 provides temporary storage for data (packets) flowing between hub 30 and network 10. A repeater 57 directs data flow on LAN 12. A content addressable memory (CAM) 54 is addressable with a network address and outputs an associated port. A broadcast SRAM 56 is used for temporary storage of multi-port messages which are to be broadcast across LAN 12.

A network management subsystem 58 provides network management. Network management subsystem 58 includes a processor 60, an EPROM 62, a RAM 61 and a memory access controller (MAC) 59. EPROM 62 stores program information used by processor 60. RAM 61 stores programs used by processor 60. MAC 59 provides a means for processor 60 to communicate with other nodes on the network.

A transceiver 63 is used to send and receive data to and from a network device (node) connected to a connector 67. A transceiver 64 is used to send and receive data to and from a network device connected to a connector 68. A transceiver 65 is used to send and receive data to and from a network device connected to a connector 69. A transceiver 66 is used to send and receive data to and from a network device connected to a connector 70. While only transceivers 63 through 66 and connectors 67 through 70 are shown, many more transceivers and connectors can be added. For example, in the preferred embodiment of the present invention, the hub has 24 ports. A transformer/filter 73 connects transceiver 63 to connector 67. A transformer/filter 74 connects transceiver 64 to connector 68. A transformer/filter 75 connects transceiver 65 to connector 69. A transformer/filter 76 connects transceiver 66 to connector 70.

Figure 5:
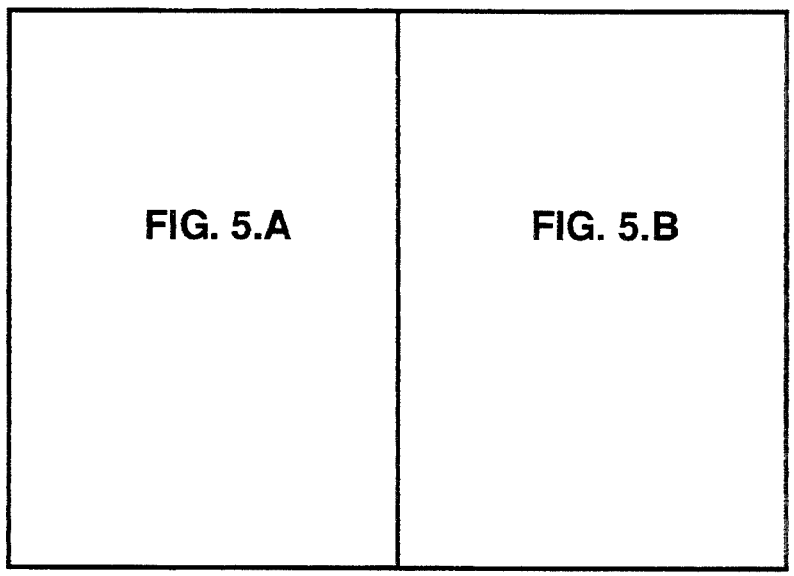

FIG. 5 shows a block diagram of transceiver 63. Transceiver 63 is connected to connector 67 through four UTP wire pairs. The first pair includes a connector line 81 and 82 (FIG. 5B). The second wire pair includes a connector line 83 and 84. The third wire pair includes a connector line 85 and 86. The fourth wire pair includes a connector line 87 and 88. When transceiver 63 receives the four streams of data over the four pairs (81–88), the data is received by equalizer circuits 91–94 whose function is to compensate for the insertion loss variations of the path with frequency (i.e., rolloff). Each of equalization circuits 91 through 94 ideally provides a clean and amplified signal. In addition, equalization circuit 91 also provides a carrier detector signal on a carrier detector line 180.

A phase locked loop (PLL) clock and data recovery circuit 101 receives a clean and amplified signal on line 181 and 182. PLL clock and data recovery provides a data signal on a line 171, a clock signal on a line 175 and a clock valid signal on a line 279. A PLL clock and data recovery circuit 102 receives a clean and amplified signal on line 183 and 184. PLL clock and data recovery provides a data signal on a line 172, a clock signal on a line 176 and a clock valid signal on a line 280. A PLL clock and data recovery circuit 103 receives a clean and amplified signal on line 185 and 186. PLL clock and data recovery provides a data signal on a line 173, a clock signal on a line 177 and a clock valid signal on a line 281. A PLL clock and data recovery circuit 104 receives a clean and amplified signal on line 187 and 188. PLL clock and data recovery provides a data signal on a line 174, a clock signal on a line 178 and a clock valid signal on a line 282.

Referring to FIG. 5A, elasticity buffers 111, 112, 113 and 114 synchronize the data signals from PLL clock and data recovery circuits 101–104 to a single clock. Elasticity buffer 111 receives the data signal and clock signal from PLL clock and data recovery circuit 101 and produces a synchronized data signal on line 191. Elasticity buffer 112 receives the data signal and clock signal from PLL clock and data recovery circuit 102 and produces a synchronized data signal on line 192. Elasticity buffer 113 receives the data signal and clock signal from PLL clock and data recovery circuit 103 and produces a synchronized data signal on line 193. Elasticity buffer 114 receives the data signal and clock signal from PLL clock and data recovery circuit 104 and produces a synchronized data signal on line 194.

A logic OR gate 170 receives the clock signal on line 175, the clock valid signal on line 279, the clock valid signal on line 280, the clock valid signal on line 281 and the clock valid signal on line 282. OR gate 170 produces a clock signal(Clk 0) on line 190. The Clk 0 signal passes through OR gate 170 when the four clock valid signals are asserted low. Driver buffer 106 forwards data to repeater 57 on a line 126, a line 127, a line 128 and a line 129. Driver 106 also provides a clock signal on a line 129. Receive line state logic 105 is used to receive and forward transfer set-up requests over the first and the second twisted wire pairs. Receive line state logic 105 receives the carrier detector signal on carrier detector line 180, the data signal on line 171, the data signal on line 172 and the clock signal on line 175. Receive line state logic 105 produces a priority (PRI) request signal on line 121, a receive line state signal (RLS0) on line 122, a receive line state signal (RLS1) on line 123, and a receive line state signal (RLS2) on line 124 for forwarding to repeater 57. Repeater enables receive line state logic 105 by placing a receive line state enable signal on a line 125. A receiver enable signal (RXEN) is generated by repeater 57 to select receive line state logic 105 or driver buffer 106 to forward information to repeater 57.

Referring to FIG. 4, when transceiver 63 transmits data to repeater 57, it places a first data signal (TDATA0) on transmit data line 137 (in FIG. 5A), a second data signal (TDATA1) on transmit data line 138, a third data signal (TDATA2) on transmit data line 139 and a fourth data signal (TDATA3) on transmit data line 140. When transceiver 63 transmits control signals to repeater 57, it places a first transmit line signal (TLS0) on line 132, a second transmit line signal (TLS1) on a line 133, a third transmit line signal (TLS2) on a line 134, and a transmit line clock (TLSCK) on a line 135. TLSCK is used to store the TLS values. Transmit line state logic 115 generates tones and drives the TLS values to be forwarded to a multiplexer/transmitter 116.

Multiplexer/transmitter 116 (FIG. 5A), in response to a transmit enable signal (TXEN) on a line 136, selects either data signals on lines 137, 138, 139 and 140 to be forwarded to the four twisted wire pairs 81 through 88, or the tones and driver enables from transmit line state logic to be forwarded to the third and fourth twisted wire pairs 85 through 88. A transmitter clock (TXCLK) is provided to transmit line state logic 115 and multiplexer transmitter 116 on a line 141.

Figure 6:
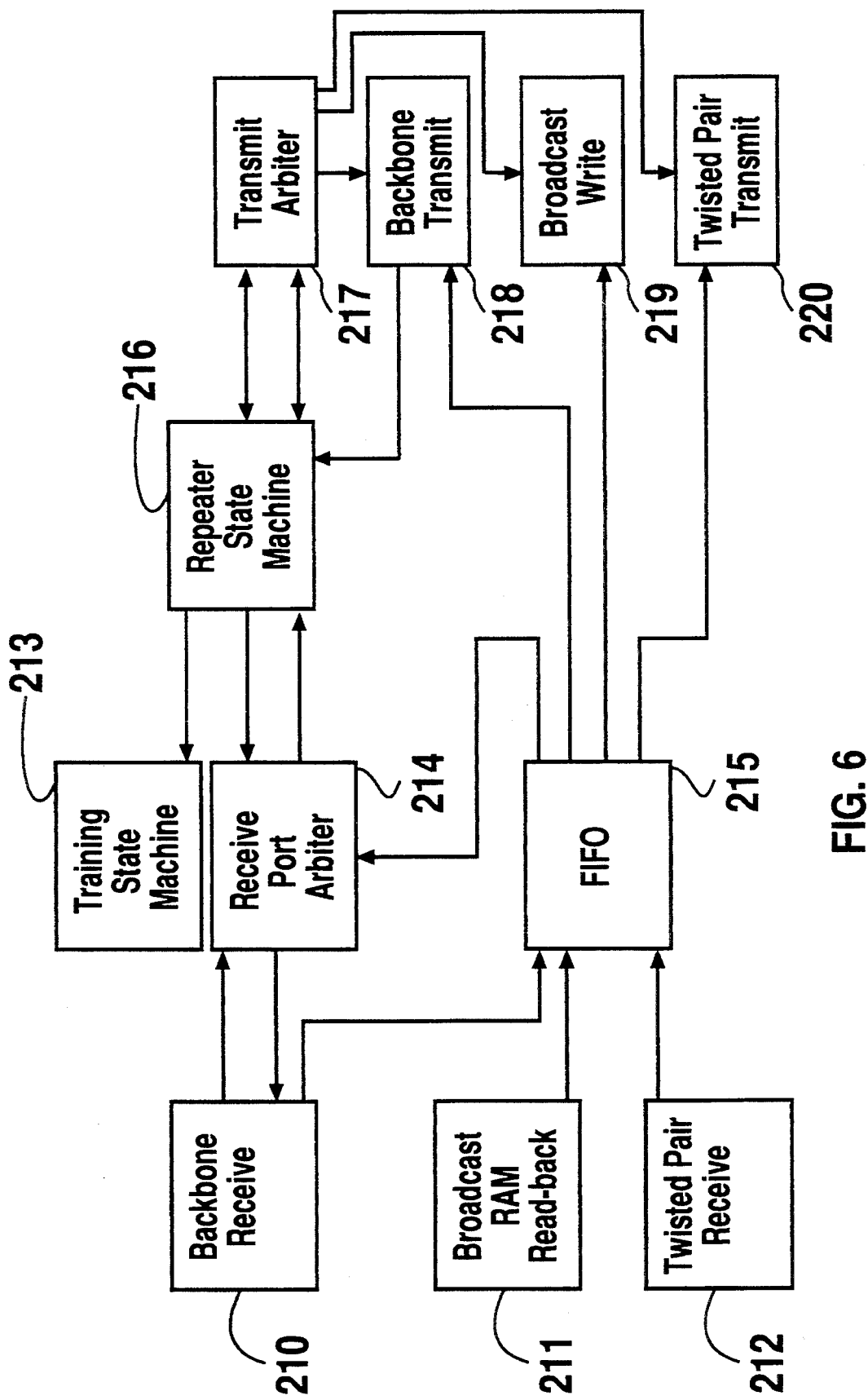
FIG. 6 shows a simplified block diagram of a repeater within the hub shown in FIG. 4 in accordance with the preferred embodiment of the present invention.

FIG. 6 is a block diagram showing data flow within repeater 57. Repeater 57 essentially functions to channel transferred data. Twisted pair receive logic 212 receives data and control signals from the transceivers, e.g., transceivers 63, 64, 65 and 66. For example, twisted pair receive logic 212 is connected to lines 121 through 131 of transceiver 63. Broadcast RAM readback logic 211 receives data from broadcast SRAM 56. Backbone receive logic receives data from bridge buffer RAM 53.

Twisted pair transmit logic 220 sends data and control signals to the transceivers, e.g., transceivers 63, 64, 65 and 66. For example, twisted pair transmit logic 220 is connected to lines 132 through 141 of transceiver 63. Broadcast write logic 219 sends data to broadcast SRAM 56. Backbone transmit logic sends data to bridge buffer RAM 53.

The data received by twisted pair receive logic 212, broadcast RAM read-back logic 211 and backbone receive logic 210 is channeled through a first-in-first-out (FIFO) buffer 215 to either backbone transmit logic 218, broadcast write logic 219 or twisted pair transmit logic 220. FIFO buffer 215 also provides arbitration information to a receiver port arbiter 214.

Receiver port arbiter 214 selects from which port to receive a data transmission. In general, a simple arbitration scheme is used. For example, a round robin arbitration scheme may be used in which the last port from which a data transmission is received is given lowest priority. A transmit arbiter 217 determines to which port of backbone transmit logic 218, broadcast logic write 219 or twisted pair transit logic 220 data is to be transmitted. Transmit arbiter 217 determines where to send a message by forwarding a network address of the message to CAM 54. CAM 54 returns a port number to transmit arbiter 217. Repeater 57 also includes a repeater state machine 216 and a training state machine 213.

Figure 7:
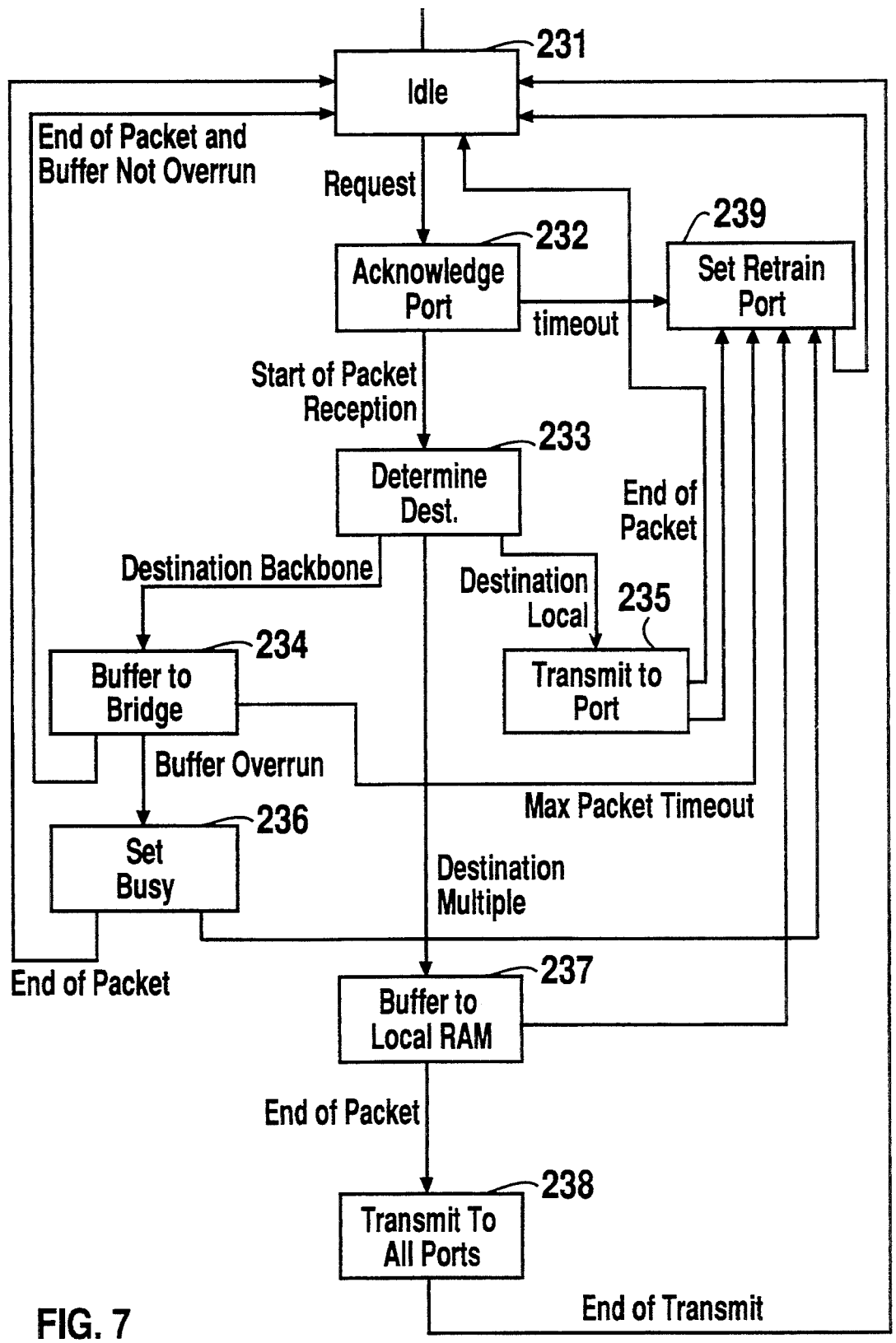
FIG. 7 is a state diagram for a repeater state machine within the repeater shown in FIG. 6.

FIG. 7 shows a state diagram for repeater state machine 216. After start-up of the repeater and training of all ports (as explained below) has taken place, repeater state machine 216 is in idle state 231. Upon receiving a request for transfer from receiver port arbiter 214, repeater state machine enters an acknowledge port state 232. When repeater state machine 216 is in the acknowledge port state, repeater 57 sends an acknowledge signal to the port which was selected by receiver port arbiter 214. If repeater 57 times out before it begins to receive a data packet from the selected port, repeater state machine 216 enters a set retrain port state 239. In set retrain port state 239, repeater state machine 216 signals training state machine 213, to retrain the port. Repeater state machine 216 then returns to idle state 231.

From acknowledge port state 232, upon repeater 57 beginning to receive a network data packet, repeater state machine 216 enters a determine destination state 233. While repeater state machine 216 is in determine destination state 233, transmit arbiter 217 determines where to send a message by forwarding the network address in the network data packet to CAM 54. CAM 54 returns a port number to transmit arbiter 217.

If transmit arbiter 217 determines the destination is to a port within local network 12, repeater state machine 216 enters a transmit to port state 235. In transmit to port state 235, data as it is received from the port selected by receive port arbiter 214 is forwarded immediately to the port selected by transmit arbiter 217. Upon repeater 57 receiving the complete network data packet and completion of the forwarding of the data, repeater state machine 216 returns to idle state 231. If the complete data packet is not received within a specified time, repeater state machine 216 enters set retrain port state 239.

In determine destination state 233, if transmit arbiter 217 determines the destination is to multiple ports within local network 12, repeater state machine 216 enters a buffer to local RAM state 237. In buffer to local RAM state 237, data as it is received from the port selected by receive port arbiter 214 is forwarded to broadcast SRAM 56. If a complete data packet is not received within a specified time, repeater state machine 216 enters set retrain port state 239. Upon repeater 57 receiving the complete network data packet and completion of the forwarding of the data to broadcast SRAM 56, repeater state machine 216 enters a transmit to all ports state 238. In transmit to all ports state 238, repeater 57 reads the broadcast message in broadcast SRAM 56 and forwards the message to each of the ports specified. Upon completion of the data transmissions, repeater state machine 216 returns to idle state 231.

In determine destination state 233, if transmit arbiter 217 determines the destination is to the backbone of local network 12, repeater state machine 216 enters a buffer to bridge state 234. In buffer to bridge state 234, data as it is received from the port selected by receive port arbiter 214 is forwarded to bridge buffer RAM 53. If a complete data packet is not received within a specified time, repeater state machine 216 enters set retrain port state 239. Upon repeater 57 receiving the complete network data packet and completion of the forwarding of the data to buffer RAM 53, repeater state machine 216 returns to idle state 231. If buffer RAM 53 runs out of available memory locations before completion of the transfer of the network data packet, repeater state machine 216 enters a set busy signal state 236. In set busy signal state 236, repeater 57 sends a busy signal to the transmitting data port and throws away the network data packet. Upon completion of the transfer of the network data packet to repeater 57, repeater state machine 216 returns to idle state 231.

Figure 8:
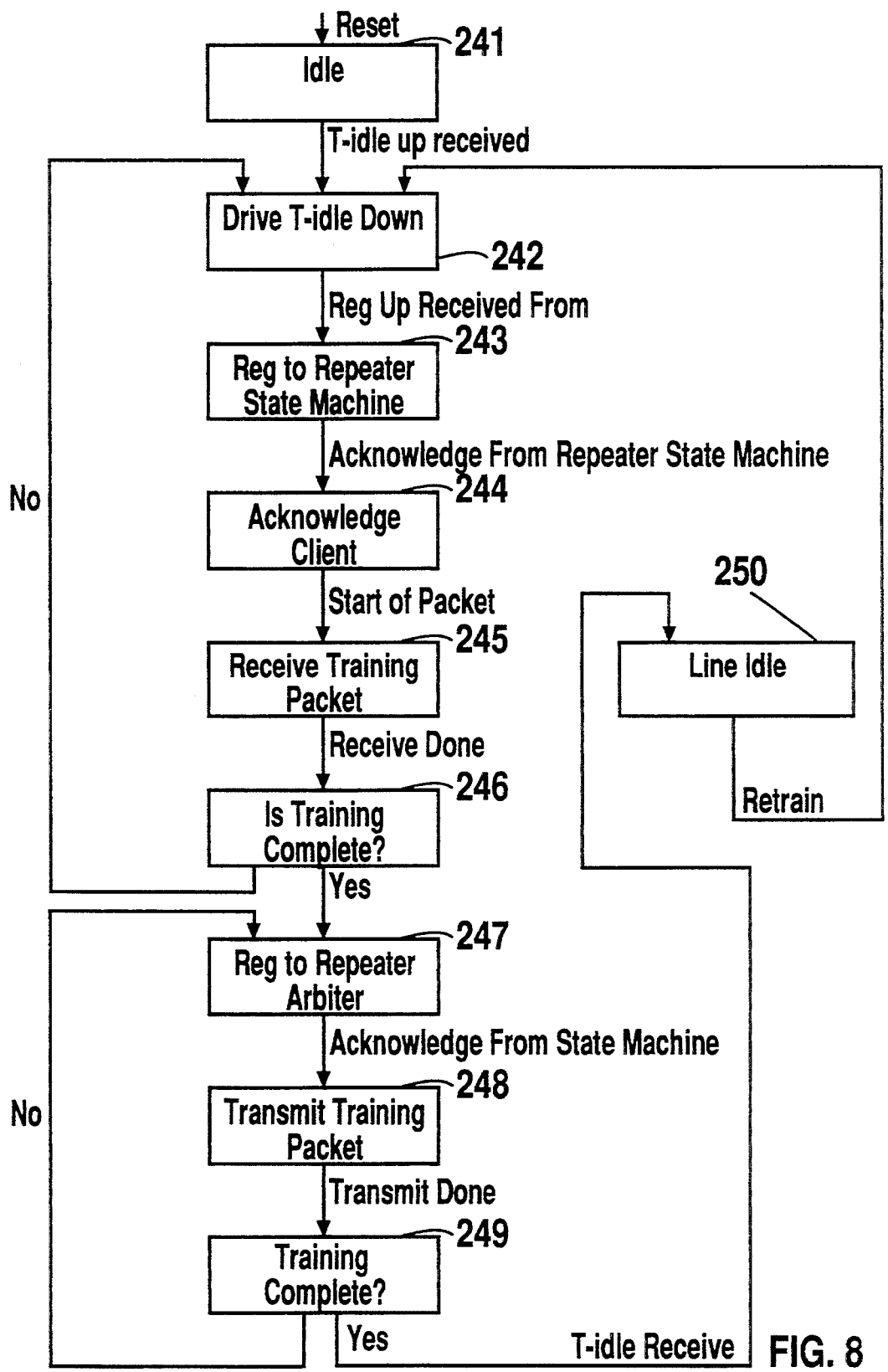
FIG. 8 is a state diagram for a training state machine within the repeater shown in FIG. 6.

FIG. 8 is a state diagram for the training state machine 213 shown in FIG. 6. After a reset or whenever it is necessary to train a port, training state machine 213 proceeds through the training states. Before training a port, training state machine 213 is in an idle state 241. When the training state machine 213 receives a training idle up signal from a port which requests training, the training state machine 213 enters a drive-T-idle (training idle)-down state 242. In drive-T-idle-down state 242, repeater 57 sends a training idle down signal to the port requesting training.

Upon receiving a request-to-transmit signal from the port to be trained, training state machine 213 enters a request-to-repeater state machine state 243. In request-to-repeater-state-machine state 243, training state machine 213 waits for repeater state machine 216 to acknowledge the port to be trained. Upon repeater state machine 216 providing the acknowledgment, training state machine 213 enters an acknowledge client state 244. In acknowledge-client state 244, training state machine 213 waits for the port to start sending a training packet.

Upon the port starting to send a packet, training state machine 213 enters a receive training packet state 245. In receive-training-packet state 245, training state machine 213 waits for completion of the sending of the training packet. When the training packet has been received, training state machine 213 enters a training completion state 246. In the training completion state 246, a check is done to see whether receive training is complete. For example, in the preferred embodiment, training is complete if 25 consecutive training packets have been received without errors. If there are errors in reception, the equalization and clock frequencies are adjusted in the transceiver for the port. If receive training is not complete, training state machine 213 returns to drive T-idle-down-state 242.

When receive training is complete, training state machine 213 enters a request-to-repeater-arbiter state 247. In request-to-repeater-arbiter state 247, training state machine 213 requests transmit arbiter 217 to initiate the transmission of a training packet to the port being trained. Upon receiving an acknowledgment from repeater state machine 216, training state machine 213 enters a transmit-training-packet state 248. Upon completion of the transmission of the transmit-training-packet state, training state machine 213 enters a training complete state 249. If transmit training is not complete, training state machine 213 returns to request-to-repeater-arbiter state 247.

When transmit training is complete, training state machine 213 enters line idle state 250. Training state machine 213 remains in line idle state 250 during normal operation of the port. When the port requests retraining, training state machine 213 returns to drive-training-idle-down state 242.

Figure 9:
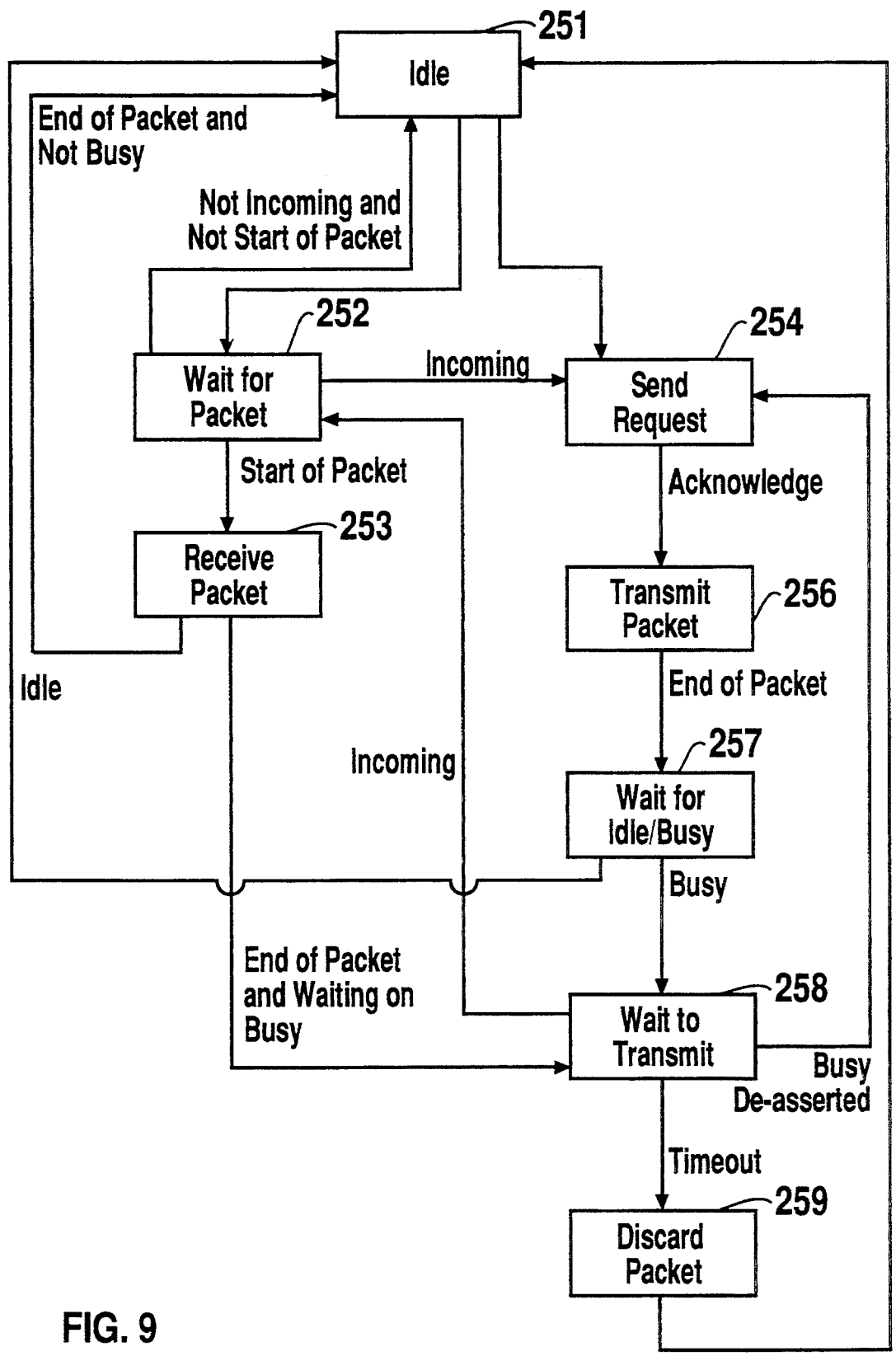
FIG. 9 is a state diagram for a client state machine within the network device shown in FIG. 3A.

FIG. 9 shows a state diagram for client-state machine 502 (FIG. 3A). Client-state machine 502 is initially in an idle state 251. When hub 30 signals that a packet will be incoming to the client, client-state machine 502 enters a wait-for-packet state 252. In wait-for-packet state 252, if the client sees the receive line state transition to a state other than incoming, such as idle, client-state machine 502 returns to idle state 251. Upon the client beginning to receive a packet, client-state machine 502 enters a receive-packet state 253.

In the receive-packet state 253, client-state machine 502 waits for the end of the packet to be received. When the end of the packet is received and client-state machine 502 is not waiting on a busy signal, client-state machine 502 returns to idle state 251. When the end of the packet is received and client-state machine 502 is waiting on a busy signal, client-state machine 502 enters a wait to re-transmit state 258.

From idle state 251, when the client desires to transmit a data packet, the client-state machine 502 enters a send request state 254. In the send request state 254, the client sends a request-to-transmit signal to hub 30. The client then waits for an acknowledgment signal from hub 30 (indicating that the link is clear to send). While waiting for an acknowledgment, if hub 30 signals the client that a packet will be incoming to the client, the client-state machine 502 enters the wait-for-packet state 252 to inhibit messsage transmission from the client. In the send-request state 254, when the client receives an acknowledgment from hub 30, client-state machine 502 enters a transmit packet state 256. In the transmit packet state 256, the client sends a data packet to hub 30. Upon the end-of-packet being sent, client-state machine 502 enters a wait-for-idle/busy state 257. In wait-for-idle/busy state 257, if the client receives an idle signal from hub 30, transmission of the packet was successful and client-state machine 502 returns to idle state 251. If the client receives a busy signal from hub 30, client-state machine 502 enters wait to re-transmit state 258.

In the wait-to-transmit state 258, client-state machine 502 waits for hub 30 to stop sending a busy signal. If hub 30 signals that a packet will be incoming to the client, client-state machine 502 enters wait-for-packet state 252. When in wait-to-transmit state 258, if client-state machine 502 detects the busy signal from hub 30 being de-asserted, client-state machine 502 returns to send-request state 254. When in wait-to-transmit state 258, if client-state machine 502 times out waiting for hub 30 to de-assert the busy signal, the client-state machine 502 enters a discard-packet state 259. When in the discard-packet state 259, the client discards the network packet and returns to the idle state 251.

There are situations where a client might be the end-node destination address for a very long string of incoming packets and given the above description it might appear that a send request would not be allowed. In response to an incoming packet signal, the client must switch to the wait-for-packet state 252 then to the receive-packet state 253 upon the reception of a packet. However, according to one embodiment of this invention, to preclude the client from not being able to send an out bound data packet, a request window is built into the normal request cycle. The request window is a short period of idle signal (roughly 500 ns) following a data packet to the client. This idle period is sufficient to enable the client to send up a request-to-send signal (state 254) to hub 30. Hub 30 stores the request-to-send signal in RAM 61, FIG. 4, and references the client destination address for future use after the data packet is received by the client. Alternatively, a simple register associated with each transceiver (63–66) could be used to record that the associated end node has a send request pending.

Another alternative employed in the preferred embodiment is to have the client enter a send request state 254 from state 251 even if an incoming control signal is being received. Since the signalling is over a duplex path, such bidirectional signals do not interfere. As soon as the send request is sent, the client-state machine 502 enters a wait-for-packet state 252. Then in the wait-for-packet state 252, the client switches to either idle state 251 or to the receive-packet state 253.

Figure 10:
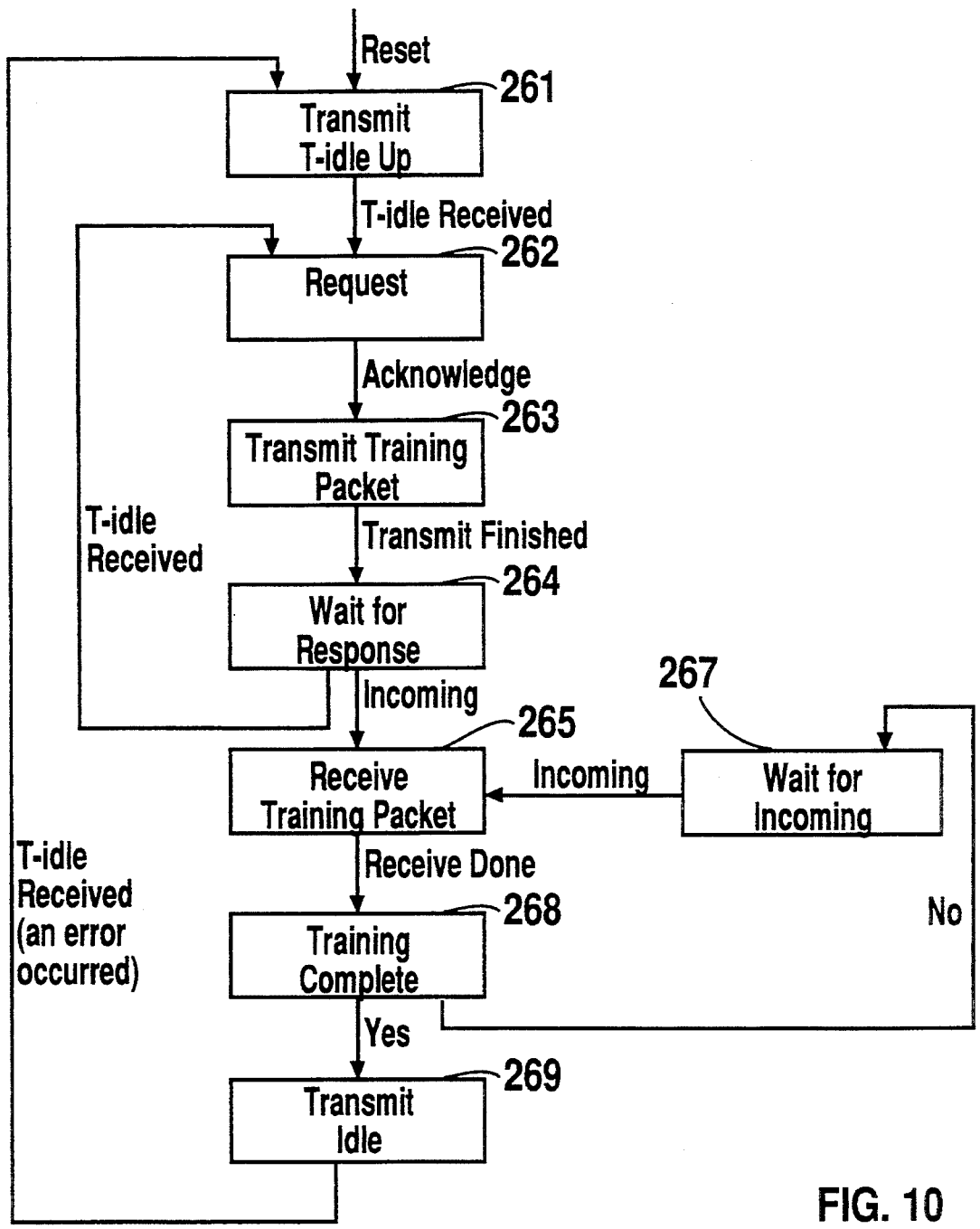
FIG. 10 is a state diagram for a client training state machine within the network device shown in FIG. 3A.

FIG. 10 shows a state diagram for client-training-state machine 501. Upon receipt of a reset, client-training-state machine 501 enters a transmit-T-idle-up state 261. In transmit-T-idle-up state 261, the client forwards to hub 30 a T-idle-up signal. When hub 30 receives the T-idle up signal from the client, the hub responds with T-idle back to the client. Upon hub 30 signaling the client that the T-idle-up signal has been received, client-training-state machine 501 enters request state 262. When client-training-state machine 501 is in request state 262, the client signals to hub 30 a request to transmit a training packet. Upon an acknowledgment from hub 30, client-training-state machine 501 enters a transmit-training-packet state 263. When client-training-state machine 501 is in transmit-training-packet state 263, the client transmits the training packet to hub 30. When the transmission is complete, client-training-state machine 501 enters a wait-for-response state 264.

When client-training-state machine 501 is in the wait-for-response state 264 and the client receives a T-idle signal from hub 30, client-training-state machine 501 returns to request state 262. When client-training-state machine 501 is in the wait-for-response state 264 and the client receives from hub 30 an incoming packet signal, client-training-state machine 501 enters a receive-training-packet state 265.

In receive-training-packet state 265, when the client has received the entire training packet, client-training state machine 501 enters a training-complete state 268. If training is not complete, client-training-state machine 501 enters a wait-for-incoming state 267. When client-training-state machine 501 is in wait-for-incoming state 267 and the client receives from hub 30 an incoming packet signal, client-training-state machine 501 enters receive-training-packet state 265.

When client-training-state machine 501 is in training complete state 268 and training is complete, client-training-state machine 501 enters training idle state 269. When client-training-state machine 501 is in training idle state 269, the client is in a normal operating state. Upon a transmission error occurring, the client receives a T-idle signal from hub 30. Upon receipt of the T-idle signal from hub 30, client-training-state machine 501 returns to transmit T-idle up state 261.

Figure 11:
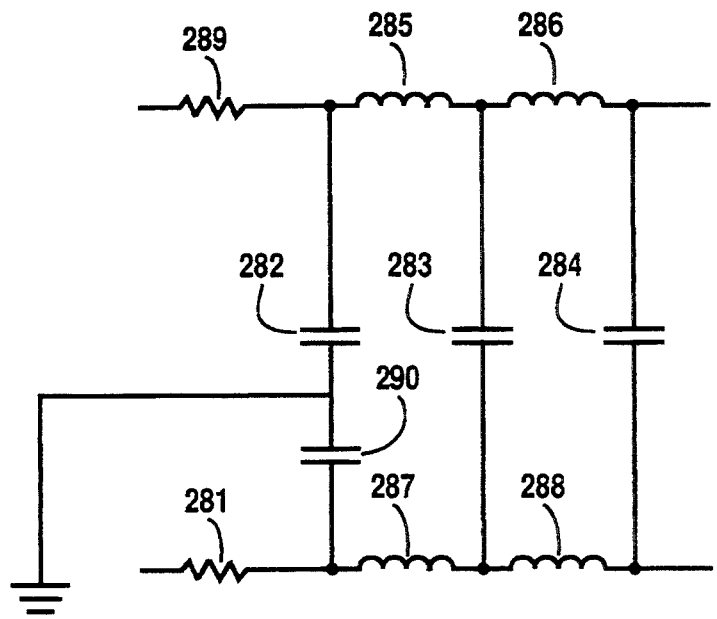
FIG. 11 is an example of a filter design which may be used the hub shown in FIG. 4 and the network device shown in FIG. 3.

FIG. 11 shows an example of a filter design which may be used to implement filters 73 through 76 within hub 30, and may also be used to implement the filter portion of transformer and filter 36 within network interface 41. For example, this filter has a return loss of less than or equal to −20 dB for signals from 100 kHz to 15 MHz. The 3 dB cutoff frequency is between 19–21 MHz. Stopband attenuation is greater than or equal to 13.5 dB at 30 MHz. The filter includes, for example, resistors 281 and 289, capacitors 282, 283,284, and 290, inductors 285, 286, 287 and 288, connected as shown. For example, resistors 281 and 282 are 50 ohms, capacitors 282 and 290 are 33 pF, capacitor 283 is 110 pF, capacitor 284 is 160 pF, inductor 285 and 287 are 330 nH, and inductors 286 and 288 are 680 nH.

In the preferred embodiment of the present invention, the physical layer implementation of the connection between hub 30 and network interface 41 is intended to provide a high speed communications link over low cost wiring. The below described specific application provides a 100 megabit/second (Mb/s) communication channel over voice grade telephone wire. This is done by multiplexing 4 adjacent channels at 25 Mb/s each.

The media type for the twisted pairs is, for example, Category III UTP, Category IV UTP or Category V UTP. The media distance is for example 100 meters when using Category III UTP, 120 meters when using Category IV UTP, or 150 meters when using Category V UTP. The media configuration is a 4 pair, 25 pair bundles, (10BASE-T compatible wiring systems).

In implementing the physical layer, a method of transmitting 25 Mb/s of information within a similar bandwidth to 10BASE-T encoding is desired to provide comparable attenuation and crosstalk characteristics. Comparable SNR and DC balance is also desired. For this purpose non-return to zero (NRZ) encoding using a 5B/6B block code is utilized to provide maximum balance. This is done by taking all balanced 6B symbols and associating them with particular 5B symbols. Then, the remaining 5B symbols are associated with two alternative 6B symbols that are unbalanced by a single bit. These two symbols are chosen for a particular 5B mapping, such that one is weight 2 and the other is weight 4 as shown in the example in Table 1. During transmission, a status bit determines whether the last unbalanced 6B symbol sent was positive (weight 4) or negative (weight 2). If the status indicates the last unbalanced 6B symbol was positive, the encoder then uses the negative symbol for the next unbalanced 6B symbol and toggles the status bit. This way the DC balance is maintained in the data stream. Care is taken to ensure that the unbalanced symbols have no more than three consecutive bits on the symbol boundary. This way the run-length is limited to no greater than six bit times. The following block code listed in Table 1 below meets the above criteria.

TABLE 1

| # | 5B/6B | weight # of 1's | # | 5B/6B | weight # of 1's | ALT 5B/6B | weight # of 1's |
|---|-------|-----------------|---|-------|-----------------|-----------|-----------------|
| 0 | 000111 | 3 | 16 | 110100 | 3 | | |
| 1 | 001011 | 3 | 17 | 111000 | 3 | | |
| 2 | 001101 | 3 | 18 | 010101 | 3 | | |
| 3 | 001110 | 3 | 19 | 110010 | 3 | | |
| 4 | 010011 | 3 | 20 | 011011 | 4 | 100100 | 2 |
| 5 | 010110 | 3 | 21 | 011101 | 4 | 100010 | 2 |
| 6 | 011001 | 3 | 22 | 011110 | 4 | 100001 | 2 |
| 7 | 011010 | 3 | 23 | 100111 | 4 | 011000 | 2 |
| 8 | 011100 | 3 | 24 | 101011 | 4 | 010100 | 2 |
| 9 | 100011 | 3 | 25 | 101101 | 4 | 010010 | 2 |
| 10 | 100101 | 3 | 26 | 101110 | 4 | 010001 | 2 |
| 11 | 100110 | 3 | 27 | 111010 | 4 | 000101 | 2 |
| 12 | 101001 | 3 | 28 | 110101 | 4 | 001010 | 2 |
| 13 | 101100 | 3 | 29 | 110110 | 4 | 001001 | 2 |
| 14 | 110001 | 3 | 30 | 111001 | 4 | 000110 | 2 |
| 15 | 101010 | 3 | 31 | 110011 | 4 | 001100 | 2 |

Table 2 below lists the frame format for the transfer of data at the physical level.

TABLE 2

| | |
|---|---|
| Preamble | - 8 symbols (sextets) of alternating 0s and 1s. |
| Start Delimiter | - 1 symbol (sextet) of a specific one-zero pattern. |
| Destination Address | - 48 bits which are split up among the four pairs. |
| Source Address | - 48 bits which are split up among the four pairs. |
| Type/Length Field | - 16 bits which are split up among the four pairs. |
| Data block | - 46–1500 bytes split up among the four pairs. |
| Cyclic Redundancy check | - 32 bits used to ensure frame integrity and which are split up among the four pairs. |
| End Delimiter | - 2 symbols (sextets) of continuous ones. |
| Abort symbol | - 2 symbols (sextets) of continuous zeroes. |

The frames are distributed among the four channels by breaking up the address, data, Type/Length and Cyclic Redundancy Check (CRC) segments and multiplexing this information. The first 5bits are coded into a 6 bit symbol and transmitted onto channel 0. The second 5 bits are coded into a 6 bit symbol and transmitted onto channel 1, and so on. CRC is generated based upon the data frame's bit sequence, and compared on the receive end after demultiplexing the frame.

Because data is typically bounded on octet boundaries, and the symbols are gathered on quintet boundaries, it is likely that a few extra bits will be stuffed into the final symbol to ensure encoding on proper boundaries. When the data is returned to octet boundaries, those bits will be removed, thus making the recovery of the data complete.

Table 3 below gives control symbols used in the frame format (described below) used at the physical layer in the preferred embodiment.

TABLE 3

| | | |
|---|---|---|
| End Delimiter (ED) | 111111 | 111111 |
| Preamble (PREAMBLE) | 010101 | 010101 |
| Start Delimiter (SD) | 100101 | 100101 |
| Abort Symbol (ABORT) | 000000 | 000000 |

The code according to the preferred embodiment provides for a 15 MHz tone on PREAMBLE which will allow the minimum time for clock synchronization. Further, the code uses the same symbols in the data stream, but makes the decision that PREAMBLE/SD is only being looked for immediately after energy is detected on the link.

The transition from PREAMBLE into SD1 is designated by a "11" or "00" occurrence, and the SD symbol is balanced. The probability of misdetection can be reduced by requiring that the transceiver will not pass any received bits through until the clock has been secured, and by requiring six valid preamble bits to occur prior to accepting a valid SD. Inversion of the data stream can be determined by the polarity of the PREAMBLE-SD symbol boundary.

The End Delimiter is composed of all ones, and would be two such symbols back to back. This provides a sequence of twelve consecutive ones which cannot be generated by any valid data pattern. If a bit error occurs in the ED, it would appear as an invalid symbol.

The ABORT symbol is provided to allow HUB-to-HUB data transfers to be dropped with minimal effort. If a valid ED has not occurred, and two consecutive ABORT symbols appear, the receiving node considers the packet dropped.

The physical layer according to the preferred embodiment also includes scrambling. Scrambling is necessary to provide for clock recovery. In order to provide a system that operates within minimal excessive bandwidth (approximately 35%), a very low bandwidth PLL is required. This means that the distribution of spectral components must be random in order to prevent clock drift.

Scrambling is also necessary to provide for crosstalk reduction. By spreading the energy in the transmitted signal, it has been found that crosstalk is reduced by a few dB. This improves the signal-to-noise ratio (SNR) of the system. Scrambling is also necessary to provide for emissions reduction.

For the preferred embodiment of the present invention, a stream cipher of 11 bits provides the spectral dispersion necessary to ensure the above characteristics are met. Unlike a synchronous scrambler, the stream cipher does not propagate errors, nor does it exhibit the potential to "lock-up". The primary issue with stream ciphers has to do with synchronization. Since the data out of the cipher is a function of the incoming data and a pseudo random bit sequence (PRBS) of a time-dependent value, it is necessary on the receive end to know exactly what point in the sequence the data is associated with. This can be done by using a cipher on the data and presetting the cipher before performing an XOR function on its contents with the data. The bit recurrence relation is $S[n]=S[n-9]$ XOR $S[n-11]$. The four channels each have a different cipher which is initialized to a different quadrant of the PRBS to avoid the likelihood of common patterns on each wire.

Figure 12:
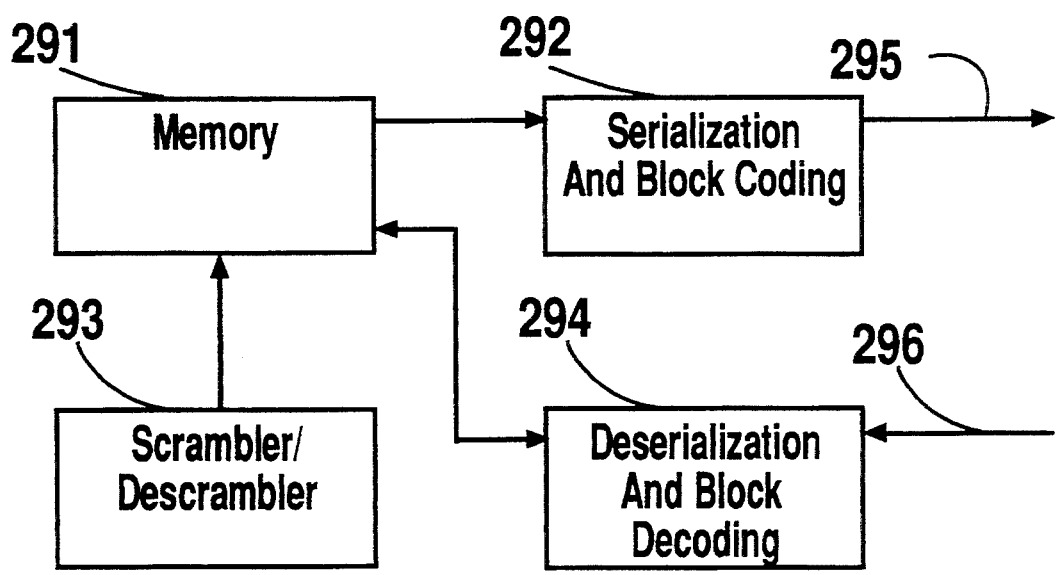
FIG. 12 shows logic blocks within a network interface which prepare data to be forwarded to a hub in accordance with the preferred embodiment of the present invention.

FIG. 12 shows logic blocks within network interface which prepare data to be forwarded to hub 30. A scrambler/descrambler 293 scrambles message, residing in a memory 291, which are to be forwarded to hub 30. Scrambler/descrambler 293 descrambles message, residing in memory 291, which have been received from hub 30. Serialization and block coding logic 292 block codes and serializes scrambled data which is then forwarded to hub 30 via a data path 295. Deserialization and block decoding logic 293 deserializes and block decodes scrambled data which is received from hub 30 via a data path 296.

Figure 13:
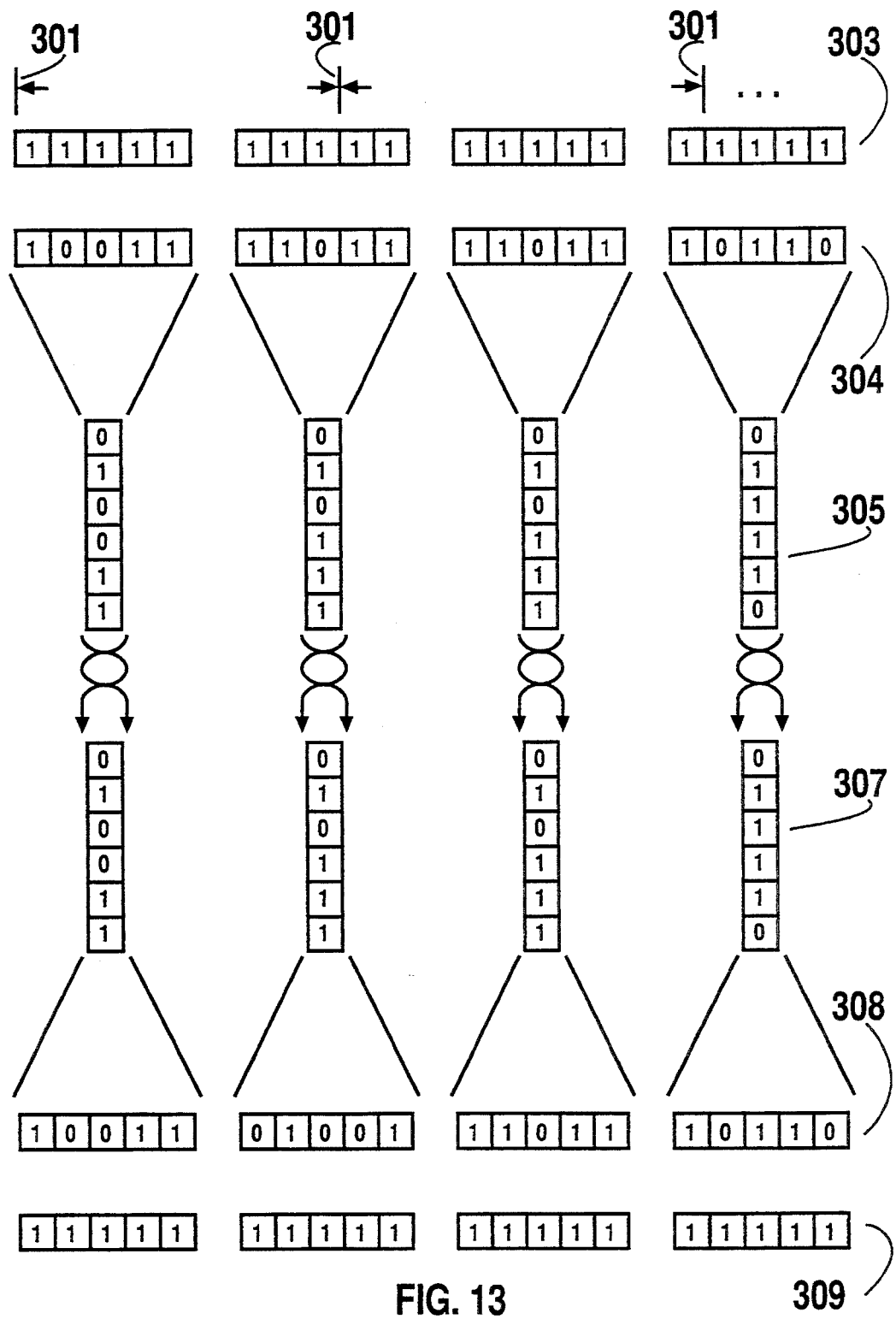
FIG. 13 shows a diagram which explains data flow within the logic blocks shown in FIG. 12.

FIG. 13 shows a diagram which explains data flow within the logic blocks shown in FIG. 12. A row of twenty bits 303 are shown in groups of five bits. Byte boundaries 301 show where byte boundaries for the twenty bits would exist in memory 291. Scrambling bits 303 yields a row of twenty bits 304. Bits 304 are serialized and block coded to produce four serial data streams 305 of six bits each. Each data stream is packetized and put onto a separate twisted pair. After being sent across LAN 12, a network device receives and depacketizes four serial data streams 307 which are identical to data streams 305. Streams 307 are deserialized and decoded to produce a row of twenty data bits 308. Data bits 308 are then descrambled to produce a row of twenty data bits 309. Data bits 309 are identical to data bits 303.

In order to maximize data flow in network 12 and avoid crosstalk, using four UTP wires, for data channels, half-duplex data channel is used. However, full duplex is used for control/status channels. This allows for noise immunity comparable to IEEE 10BASE-T standards. Using four twisted-pairs in a 10BASE-T cable and half-duplex transmission, 25 Mb/s throughput is required through each twisted wire pair.

In order to maintain adequate noise immunity, the channel bandwidth must not be significantly increased. Through empirical measurements, it has been determined that crosstalk is acceptable when system bandwidth is kept below 21 MHz. In addition, a simple binary (two level) code provides lower cost implementation.

Operating with a two level NRZ block code of reasonable efficiency, the bandwidth of the system can be constrained to less than 21 MHz. This keeps noise down, and the two level code provides robust noise-immunity. The block code must be balanced and efficiency must be above 80%. Therefore, as discussed above, a 5B/6B block code is used.

This enabling scheme utilized by the present invention allows various other protocols to operate by either doing a 25 Mb/s full duplex channel on two-pairs (e.g., as in 25 Mb/s 10BASET), a 50 Mb/s full duplex communication channel on four-pairs (e.g., as in 50 Mb/s 10BASE-T, or 45 Mb/s ATM), or dual-100 Mb/s channels on separate four-pair cables (e.g., as in FDDI, ATM).

Control/status information is full duplex in order to keep latency down. Therefore, it is possible to use two pairs for upstream communication, and two pairs for downstream communications. The transition rate of these channels is kept very low in order to minimize crosstalk effects on adjacent wires. By using tones of 0.9375 MHz–3.75 MHz crosstalk in bundles is minimized. Three tones per wire (plus a lack of tones/silence) can allow up to ten different control status signals.

In the preferred embodiment, eight line states are provided by the transceiver state machine. For the purposes of the description below, hub 30 is the master and the network devices are the slaves. Table 4 below summarizes the extant line signals.

TABLE 4

| CODE | SLAVE | MASTER | TX PR 1 | TX PR 0 | RX PR 1 | RX PR 0 |
| --- | --- | --- | --- | --- | --- | --- |
| 000 | SILENCE | SILENCE | 0 | 0 | 0 | 0 |

TABLE 4-continued

| CODE | SLAVE | MASTER | TX PR 1 | TX PR 0 | RX PR 1 | RX PR 0 |
|------|-------|--------|---------|---------|---------|---------|
| 001  | IDLE  | IDLE   | 16      | 16      | 15–17   | 15–17   |
| 010  | REQ 0 | N/A    | 16      | 8       | 15–17   | 7–9     |
| 011  | REQ 1 | SYNCH  | 8       | 16      | 7–9     | 15–17   |
| 100  | T IDLE| T IDLE | 8       | 8       | 7–9     | 7–9     |
| 101  | RSVD  | Incoming | 16    | 4       | 15–17   | 3–5     |
| 110  | RSVD  | RSVD   | 4       | 16      | 3–5     | 15–17   |
| 111  | RSVD  | RSVD   | 8       | 4       | 7–9     | 3–5     |

The listed transmits numbers (under TX PR 1 and TX PR 0) are the number of clock cycles each pulse contains. The listed receive numbers (under RX PR 1 and RX PR 0) account for sampling error.

Line state (Code 000) provides for the transmitter to be turned off completely. As seen by Table 4, the first transmitter wire pair (TX PR 0), the second transmitter wire pair (TX PR 1) the first receiver wire pair (RX PR 0) and the second receiver wire pair (TX PR 2) are all at 0 (i.e., silent). In the event that the MASTER detects silence on its receiver for an extended period of time, it will transmit silence to prevent transmitting onto an unterminated line. The SLAVE and the MASTER indicate SILENCE in the event they are about to begin reception of data. The SILENCE state allows for the twisted pair media to settle before data is inserted onto the wires.

Line state (001) indicates that the SLAVE and MASTER are connected, and the link is inactive. The state is entered upon the end of a data transmission in one of two ways. In the event of a proper transmission, the ETD/ABORT sequence would create the first IDLE symbol which would tell the receiver on the opposite end of the link to disable its data reception circuits. In the event of an aborted frame, the ETD would not appear, and the ABORT symbol would provide the first component of the IDLE tone.

Line state (010) is used by the SLAVE node to indicate a low priority request. Line state (011) is used by the SLAVE node to indicate a high priority request. This line state is used by the MASTER node to provide a synchronization pulse to end nodes.

Line state (100) is used to initiate a link connection sequence by the SLAVE node. Upon detection of this tone, the MASTER will indicate T-IDLE (training idle) which will indicate to the SLAVE that a connection exists. Then, the connection arbitration cycle (training) is then executed. Line states (101,110,111) are not implemented in the preferred embodiment.

In a preferred embodiment of the present invention, the network device (client) transmits on pairs 0,1 and the hub transmits on pairs 2 and 3. Three frequencies, 0.975 MHz, 1.85 MHz and 3.75 MHz are used. Table 4 gives assigned control signals for tile preferred embodiment.

The transceivers within hub 30 and network interface 41 generate and measure frequency of the tones. The acknowledge from the hub to a network device is not a tone frequency pair. Rather it is the event of the transition from the hub driving a tone to the hub driving no signal.

Figure 14:
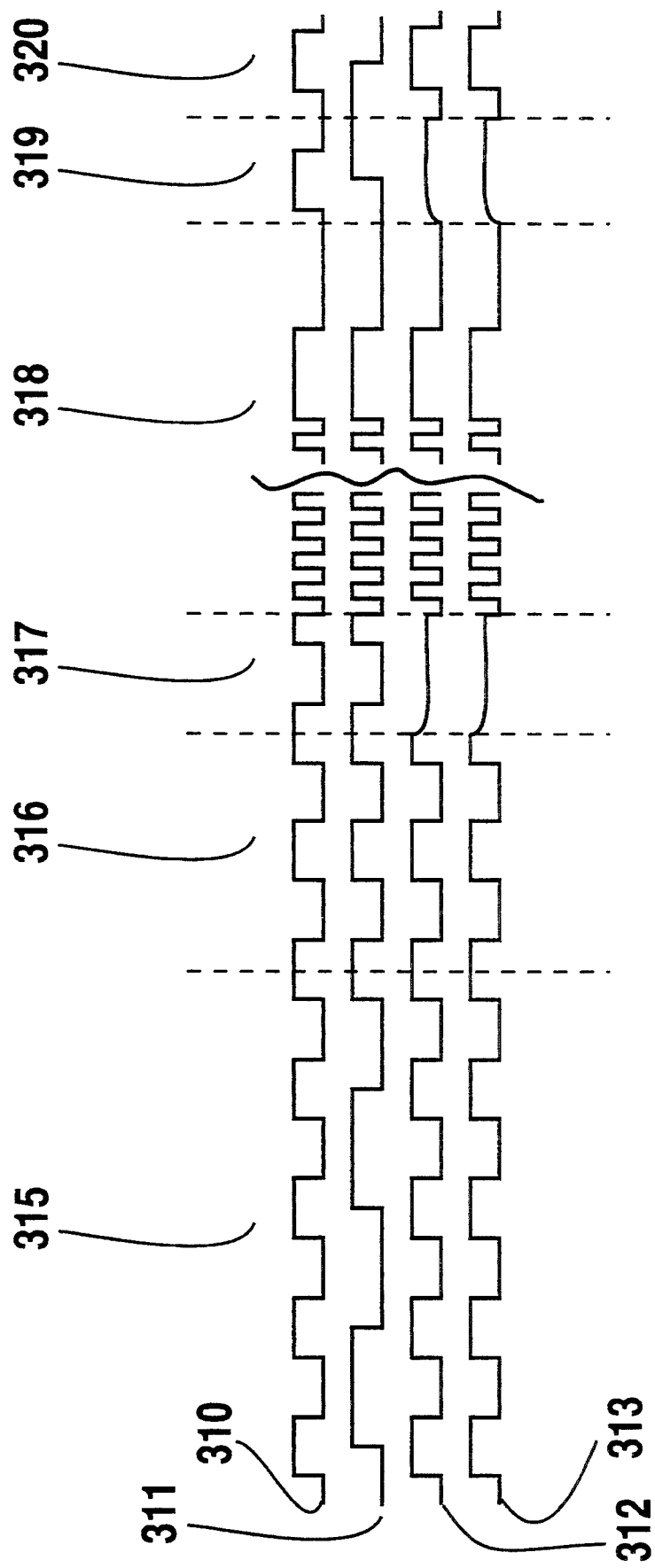
FIG. 14 is a timing diagram showing the timing of signals through a group of four twisted pair wires in accordance with a preferred embodiment of the present invention.

FIG. 14 is a simplified timing diagram which illustrates a transaction on four pair (staggering not shown). For the example transaction, two frequencies, e.g. 1 MHz and 2 MHz, are used. The network device (client) transmits on pairs 0, 1 and the hub transmits on pairs 2 and 3. Table 5 below gives the assigned control signals for a preferred embodiment.

TABLE 5

| Frequency of Tone Oscillation | | Signaled Control Signal | |
|---|---|---|---|
| First Pair (0 or 2) | Second Pair (1 or 3) | Client | Hub |
| 1 MHz | 1 MHz | Req 0 | Busy |
| 1 MHz | 2 MHz | T-idle | T-idle |
| 2 MHz | 1 MHz | Idle | Incoming |
| 2 MHz | 2 MHz | Req 0 | Idle |

The transceivers within hub 30 and network interface 41 generate and measure frequency of the tones. The acknowledge from the hub to a network device in not a tone frequency pair. Rather it is the event of the transition from the hub driving an IDLE to the hub driving no signal.

In FIG. 14, signal waveform 310 represents a signal on a first twisted wire pair between network interface 41 and hub 30. A signal waveform 311 represents a signal on a second twisted wire pair between network interface 41 and hub 30. A signal waveform 312 represents a signal on a third twisted wire pair between network interface 41 and hub 30. A signal waveform 313 represents a signal on a fourth twisted wire pair between network interface 41 and hub 30.

In a time period 315, network interface 41 is driving an idle signal on the first and second twisted wire pairs. Likewise, hub 30 is driving an idle signal on the third and fourth twisted wire pairs.

In a time period 316, network interface 41 is driving a request signal on the first and second twisted wire pairs. Hub 30 continues driving an idle signal on the third and fourth twisted wire pairs.

In a time period 317, hub 30 acknowledges the requested by allowing signals on the third and fourth twisted wire pairs to float to a middle voltage.

In a time period 318, network interface 41 transmits a data packet on all four twisted wire pairs.

In a time period 319, the end of packet has been reached. Network interface 41 stops driving the third and fourth twisted wire pairs. Network 41 starts driving an idle signal on the first and second twisted wire pairs.

In a time period 320, network interface 41 continues driving an idle signal on the first and second twisted wire pairs. Hub 30 begins driving an idle signal on the third and fourth twisted wire pairs. While this example has been for transmission of a single packet, multiple packets may also be transmitted after a single arbitration.

Key constraints of the above described system include the use in a network of four twisted wire pairs (UTP) to attach each network node to the hub. During data transmission or reception, the direction of data flow on all four twisted wire pairs is in a single direction. It is thus not possible to reliably determine whether two nodes are transmitting simultaneously because there is no way to signal a transmitting node since it is not receiving at that time. In the hardware configuration, twisted wire pairs from several clients can be combined into one cable bundle. Due to near end crosstalk, during data reception, the hub is not allowed to transmit the data packet to more than one port. However, the hub may send data packets to multiple ports while the hub is not receiving data packets. Additionally, when the hub is receiving data from one of the network nodes, the hub exchanges control signals with other network nodes. The control signals are tones which are at frequencies well below the data rate.

In order to facilitate the operation of the system over a broad range of possible cables, a period of characterizing of the cable is performed before initial transmission of user data. This is the training periods described above. It is performed each time a cable link is established, e.g., during power up or when error counts reach a predetermined level.

In the preferred embodiment, no existing network protocol is used to arbitrate network usage for this topology. Rather, as described above, a port of the hub is in one of three states at any particular point in time. The first state is where the port is transmitting a packet (four twisted wire pairs driven by client). The second state is where the port is receiving a packet (four twisted wire pairs driven by hub. The third state is during arbitration for a link (two twisted wire pairs driven by client, 2 twisted wire pairs driven the hub). At any one point in time, different ports of the hub can be in different modes, e.g., one port transmitting, one port receiving and the rest arbitrating for the next cycle.

During arbitration, pairs of low frequency tones are sent by the hub and client. These allow the hub and client to determine who gets to transmit next. In addition, other control information may be sent. During the training sequence the client notifies the hub of its network address. Also, network protocol errors retrigger the training sequence.

To support applications which require low latency and guaranteed network bandwidth availability, two priority levels of client data are supported. These two priority levels are preserved through the bridge to the backbone network.

To avoid packet loss through the bridge, a busy signal which indicates the buffer memory is full is sent to the client that has transmitted a packet which could not be stored. This signal is held until space is available in the bridge buffer. The advantage is that the packet can be retransmitted by the client hardware without depending on a software protocol timeout to retransmit.

To address the limitation of transmitting to only one client, the following method is used during reception of a packet. During reception of a packet, the repeater identifies the destination client before transmitting the packet. The data is transmitted to that port only. This has the added benefit of providing protection against an eavesdropping node. The hub does not fully receive the packet before retransmitting it. In the event the packet is intended for multiple destinations, the packet is buffered in the repeater and then retransmitted once it has been fully received.

During network operation, the hub checks all ports for requests. The following priority is used. Highest priority is granted high priority messages from the backbone. The next highest priority is granted high priority local messages. Then priority is granted to data priority messages from the backbone. Lowest priority is granted to data priority messages from the local network. When there are multiple clients requesting at the same priority level, they are satisfied in a round robin order.

The advantages of the above described embodiment of the present invention include good support for bridging, multiple priority levels and a predictable arbitration method under heavy loads.

Various preferred embodiments of the present invention can be adapted for use with various protocols. For example, preferred embodiments may be adapted to run similar to the IEEE 802.3 protocol. In one such embodiment, at the start of a packet, a client transmits on pairs 1 and 2. The hub repeats the data onto pairs 3 and 4 to the other clients. The transmitting client monitors pairs 3 and 4 for activity and the hub monitors pairs 1 and 2 for activity. Once the 802.3 arbitration has completed without a collision, i.e., the slot time has passed, the client is able to transmit on all 4 pairs. The 802.3 arbitration state machine can be used in a form to the version described above.

In an alternate embodiment, the client, at the start of a packet transmits on a first set of twisted wire pairs 1,2,3 and the hub repeats on a second set of twisted wire pairs 2,3,4. The client monitors pair 4 for activity and the hub monitors pair 1 for activity. After the arbitration is complete, the client can transmit data on all four twisted wire pairs.

Alternately, after the arbitration is complete the client can continue to transmit on only three pairs; however, in order to maintain a 100 Mb/s transmit throughput over the network, the transmission rate through each twisted wire pair would need to be correspondingly increased. For example, in order to transmit at 100 Mb/s on three lines with a 5B/6B two level code would require 40 megabaud per twisted pair, i.e., a maximum bandwidth per twisted pair of approximately 25–30 MHz.

In networks where bundles of twisted wire pairs are used, during arbitration a low frequency preamble is sent because data frequencies would generate too much crosstalk. If bundles are not used, the packet is transmitted during the arbitration at half or three quarters the final data rate, depending on whether 2 or 3 pairs are available.

In order to implement training in such an embodiment, a method similar to that described in the above described training state machines is used. In such an embodiment, for example, idle signals are sent on the cable to indicate whether a port has been trained or not. Until the training is complete, the port is not allowed to send regular packets.

The above-described embodiment of the invention has utilized a protocol in which for control signals tones are transmitted in full duplex at low frequency relative to data signals which are transmitted in half duplex. However, alternate embodiments of the present invention allow for additional adaptations to existing protocols. For example, for protocols which require collision detection, such as IEEE 802.3 protocol, various alternate embodiments may be implemented in accordance with the present invention.

For example out-of-band signaling may be used. Collision information is propagated back to the end node with a frequency that can be filtered out from the data stream. A low or high frequency could be used. Even a DC signal could be sent back on one pair to indicate collision. This would allow the data packet to be sent on all 4 pairs immediately, thus increasing network efficiency.

FIG. 15 gives one block diagram of an implementation which allows collision detection by sending collision information over a different frequency than data. A data signal generator 331 operating at a first frequency range is connected in parallel to with collision signal generator 332 and resistor 333. Collision signal generator 332 generates a collision signal at a frequency different than the first frequency range used for data. Data signals and collision signals are transmitted through transformer 334, over a twisted wire pair 335 and through a transformer 337. In parallel with a resistor 337 a filter 338 for data frequencies forwards the data signals using an amplifier 340. Likewise, a filter 339 for the collision frequency 339 forwards the collision signal using an amplifier 341.

FIGS. 16 and 17 show potential frequency spectrums for signals sent across twisted pair 335. Data signals are in a range between a first frequency f1 and a second frequency f2. Collision signals are sent a frequency f3. FIG. 16, illustrates the case where the spectrum for data frequencies 346 are at lower frequencies than the spectrum for collision frequency 347. FIG. 17, illustrates the case where the spectrum for data frequencies 346 are at higher frequencies than the spectrum for collision frequency 347.

Alternately, common-mode signalling may be used. In this case, the twisted wire pairs carry the data stream with differential mode signaling. Again, all 4 twisted wire pairs send data immediately, and collision signaling is sent back as a common mode signal on one pair with a return path on another pair. Alternately, radio frequency interference (RFI) is minimized by sending a common mode AC signal on two twisted wire pairs simultaneously. The AC signal is 180 degrees out of phase on each pair to cancel the electromagnetic fields created by a single transmitter.

Figure 18:
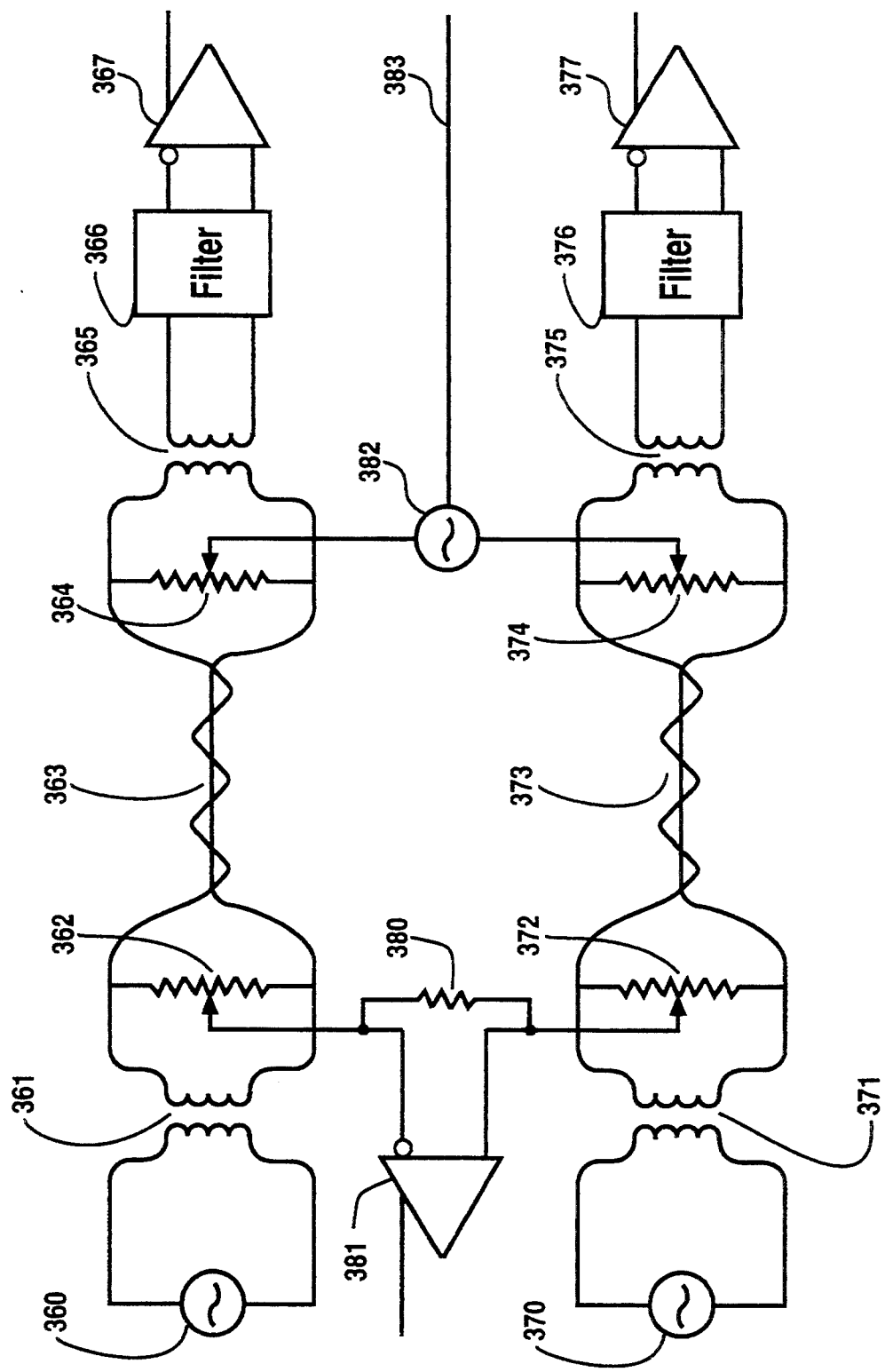
FIG. 18 shows a block diagram of a circuit which provides common-mode collision signaling in a network.

FIG. 18 shows a block diagram of an implementation which provides common-mode collision signaling. A data signal generator 360 transmits data signals through transformer 361, over a twisted wire pair 363 and through a transformer 365. A filter 366 forwards the data signals using an amplifier 367. Likewise, a data signal generator 370 transmits data signals through transformer 371, over a twisted wire pair 373 and through a transformer 375. A filter 376 forwards the data signals using an amplifier 377. A collision generator 382 is connected to a transmission resistance 364 and a transmission resistance 374. In response to an enable signal on a line 383, collision generator 382 generates a differential signal through twisted wire pair 363 and twisted wire pair 373. A collision detector consisting of an amplifier 381 and a resistor 380 is coupled between a reception resistor 362 and a reception resistor 372. The collision detector detects and forwards a collision signal generated by collision generator 382.

In an alternate embodiment, in-band signalling can be used. In this embodiment, collision information is driven to a transmitting node with an in-band frequency signal. The receiving node has a hybrid transformer that allows echo cancellation of the outgoing data stream. The network node is thus able to verify a received collision signal in addition to the data being sent. Also, active circuits which provide echo cancellation may be used which allows half duplex signaling on a four twisted wire pairs.

Figure 19:
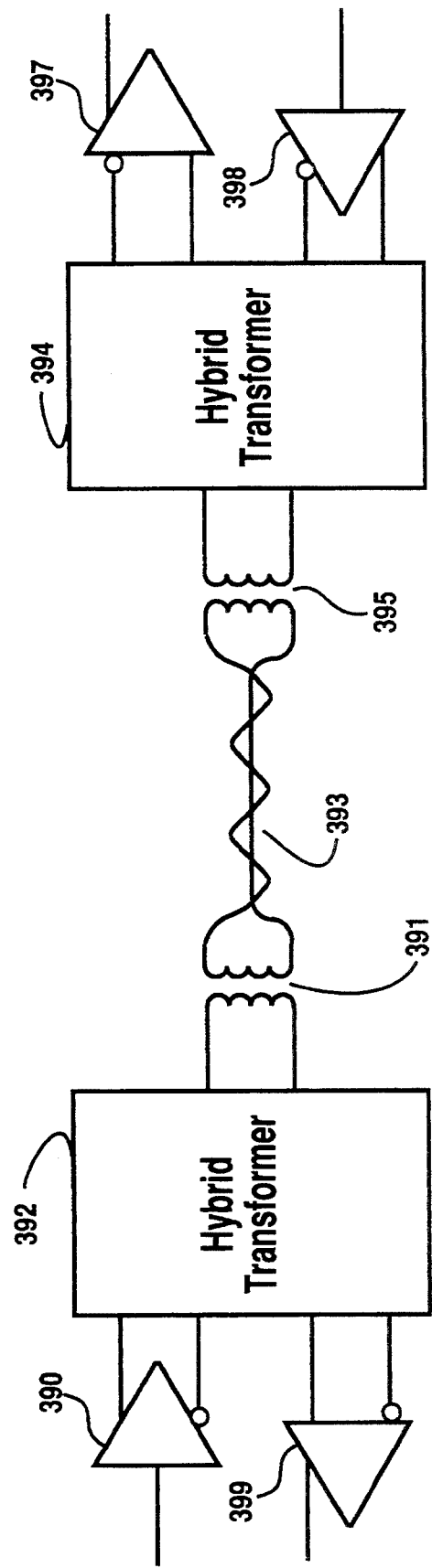
FIG. 19 shows a block diagram of a circuit which provides in-band collision signaling in a network.

FIG. 19 shows a block diagram of an implementation which provides for in-band collision signaling. A transmit amplifier 390 transmits data signals through a transformer 391 over a twisted wire pair 393 and through a transformer 395 to an amplifier 397. Likewise, a transmit amplifier 398 transmits data signals through transformer 395 over twisted wire pair 393 and through transformer 391 to an amplifier 399. A hybrid transformer 392 and a hybrid transformer 394 serve to cancel energy from being received by a nodes own transmitter. However, hybrid transformer 392 and hybrid transformer 394 will not block the incoming reception from another node. If in either case, a node is transmitting and receiving data at the same time, this indicates a collision has occurred.

Figure 20:
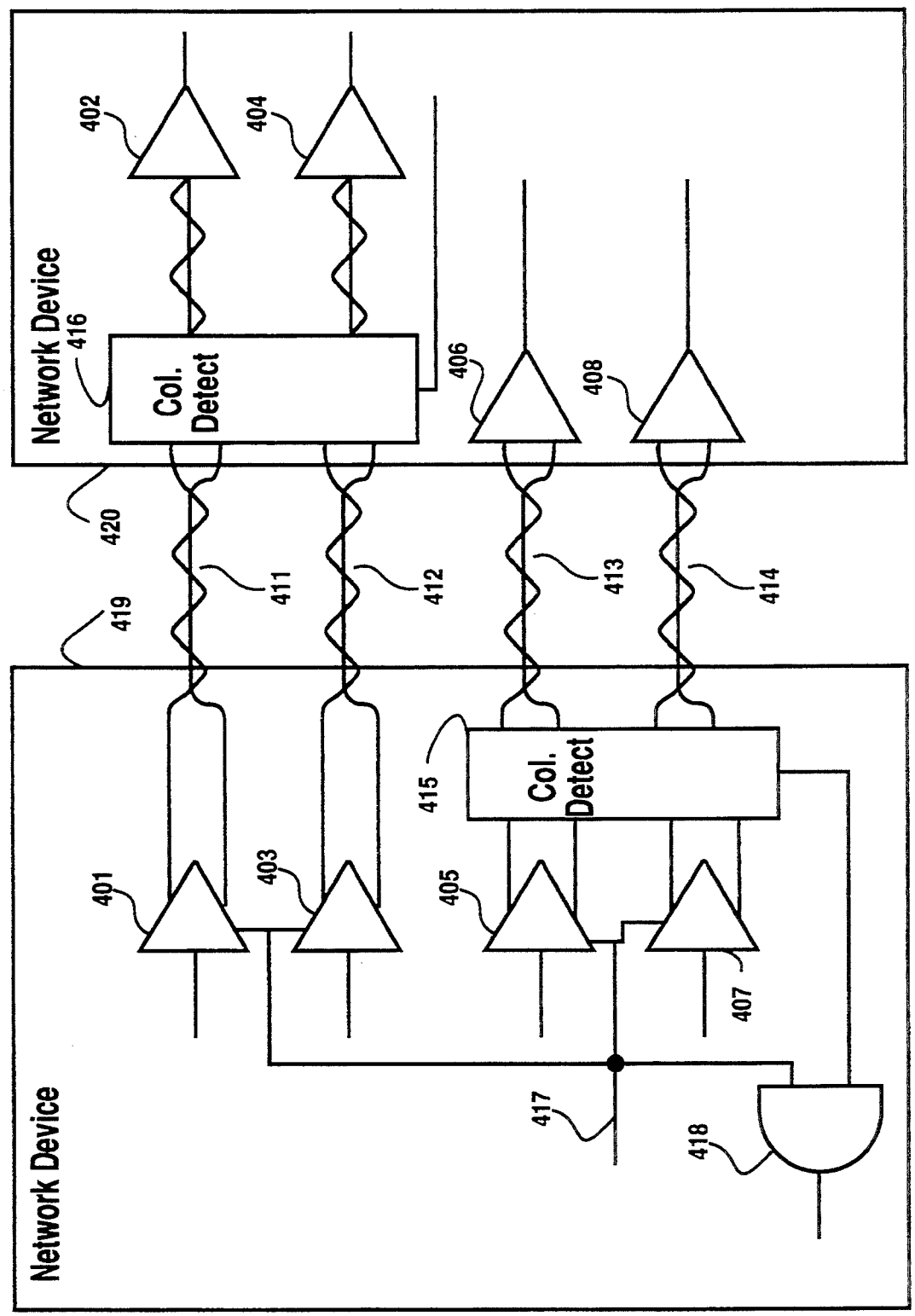
FIG. 20 is a block diagram which shows how the implementation circuit in FIG. 15 or the circuit shown in FIG. 18 may be used in a network where a network device sends data to a network device over four twisted wire pairs.

FIG. 20 shows how the implementation shown in FIG. 15, or the implementation shown in FIG. 18 could be used in a network where a network device 419 sends data to a network device 420 over four twisted wire pairs 411, 412, 413 and 414. Within network device 419, a transmitting amplifier 401 sends data over twisted wire pair 411, a transmitting amplifier 403 sends data over twisted wire pair 412, a transmitting amplifier 405 sends data over twisted wire pair 413 and a transmitting amplifier 407 sends data over twisted wire pair 414. Within network device 420, a receiving amplifier 402 receives data over twisted wire pair 411, a receiving amplifier 404 receives data over twisted wire pair 412, a receiving amplifier 406 receives data over twisted wire pair 414 and a receiving amplifier 408 receives data over twisted wire pair 415.

Collision detection is accomplished, for example, using a separate frequency as in the implementation shown in FIG. 15 or FIG. 18. Collision detection circuitry 415 within network device 419 detects collisions by listening for a collision signal sent back on twisted wire pair 413 and/or twisted wire pair 414 from network device 420 (drivers not shown). Collision detection circuitry 416 within network device 420 detects collisions by listening for a collision signal sent back on twisted wire pair 411 and/or twisted wire pair 412 from network device 419 (drivers not shown).

In this embodiment, when network device 419 desires control of the network, it begins transmission on all of twisted wire pairs: 411, 412, 413 and 414. In addition, network device 419 sends a collision signal on one or both of twisted wire pairs 411 and 412. Collision detection circuitry 415 then listens for a collision signal on twisted wire pair 413 and 414. When a transmit enable signal 417 and a collision detection signal from collision detection circuitry 415 are both activated, a logical AND gate 418 signals a collision.

In another alternate embodiment, time multiplexing is used. In this embodiment the network nodes transmit on all four twisted wire pairs. After making an initial transmission, transmission ceases or a low frequency tone is sent during a collision window period. The collision window is used by the repeater to signal that a collision on the network has occurred. The original transmitting node would continue with packet transmission if no collision signal is returned during the collision window. Otherwise, the network node will back off, for example, in accordance with the IEEE 802.3 backoff algorithm. The use of a low frequency tone (or single tone) allows the collision signal to be sent back as a different tone. This allows a simple frequency detection circuit to be used to detect the collision tone.

Figure 21:
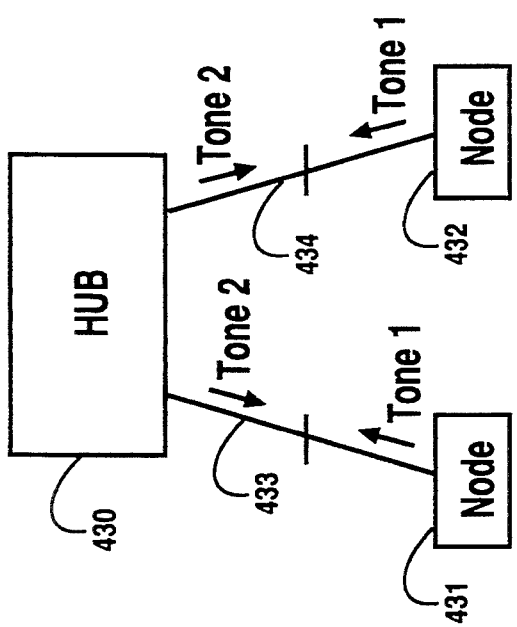
FIG. 21 shows a hub connected to network nodes through four twisted wire pairs.

FIG. 21 shows a hub 430 connected to a node 431 through four twisted wire pairs 433. Hub 430 is connected to a node 432 through four twisted wire pairs 434. In a time multiplexed hub based collision detection scheme, each node desiring to send information sends first tones during a collision interval. Hub 30 listens for the tones. If tones from more than one node is heard, hub 30 sends to all nodes a second tone indicating a collision has been detected.

Figure 22:
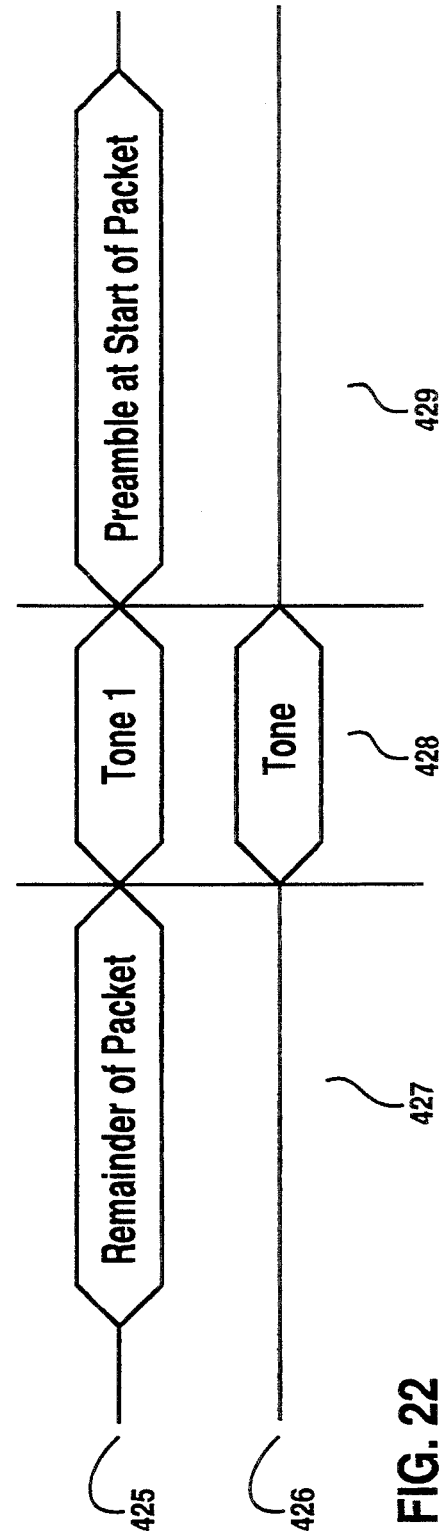
FIG. 22 shows an example of signal timing within a network.

FIG. 22 shows an example of signal timing packages used in a time-multiplexing scheme. Signal line 425 represents potential signals sent by node 431. Signal line 426 represents potential signals sent by hub 30. In a time period 427, node 431 finishes a sending a last data packet over four twisted wire pairs 433. In a collision detection period 428, node 431 and any other nodes which desire to send data send the first tone to hub 430. If hub 30 detects a collision, hub 30 sends the second tone. Otherwise in a time period 429, node 431 can begin transmission of a new network packet.

In another alternate embodiment of the present invention, a collision signal is sent after the data packet. A modification to the IEEE 802.3 protocol in accordance with this embodiment allows half-duplex operation on all 4 twisted wire pairs immediately for each data transmission. When transmitting a packet, a network node transmits a complete packet using all four twisted pairs. At the end of the packet, a collision window is opened by all nodes, allowing the repeater (Hub) to send a collision signal back to the original transmitting nodes. A network with low collision counts can have a significant increase in throughput efficiency by allowing all four pairs to transmit at the beginning of the data packet, as allowed by this embodiment.

Figure 23:
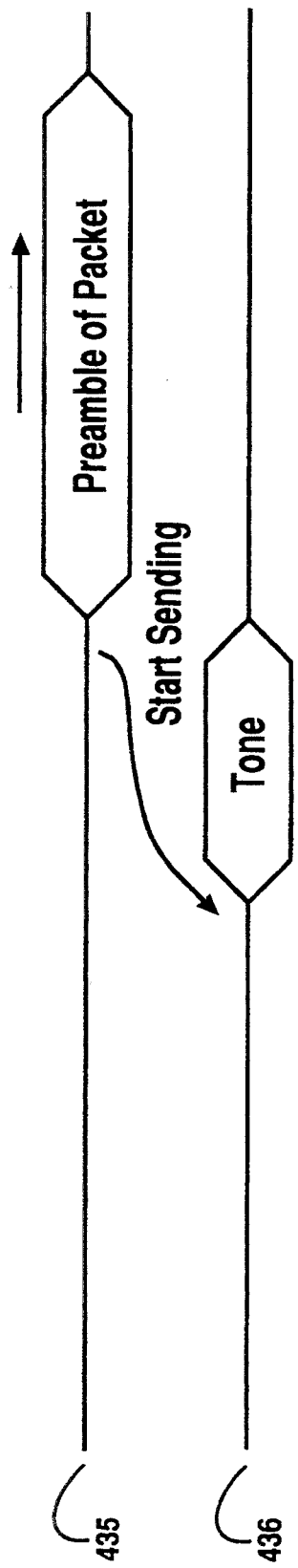
FIG. 23 shows an example of signal timing within a network.

FIG. 23 shows signal timing packages for this alternate scheme. Signal line 435 represents potential signals sent by node 431. Signal line 436 represents potential signals sent by hub 30. When there is a collision, a collision indicator (e.g., a tone) is sent to the nodes which collided. All colliding nodes would be informed after the packets were complete. Each node would then back off per the algorithm of the network program, (e.g., the 802.3 protocol).

In the preferred embodiment, a tone preamble occurs during a collision slot time. In this embodiment, a single tone is sent throughout the collision window as the data packet preamble. The single tone allows a collision signal to be sent back at an in band tone of another frequency, allowing ease of collision detection.

Figure 24:
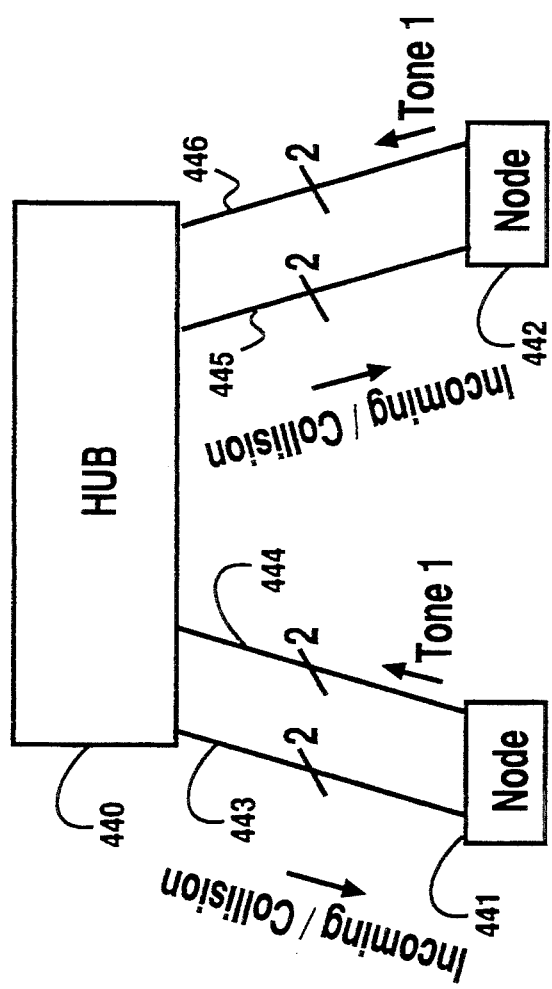
FIG. 24 shows a hub connected to network nodes in a system where there is a collision window before each packet transmission.

FIG. 24 illustrates the case where there is a collision window before each packet transmission. During the collision window, network nodes which desire to transmit data inform a hub 440 by sending first tones to hub 440. For example, a network node 441 sends to hub 440 the first tone over a first set of twisted wire pairs 444. A network node 442 sends to hub 440 the first tone over a first set of twisted wire pairs 446. As soon as hub 440 receives the first tone from any network node will begin sending an incoming signal to all nodes. For example, hub 440 will send an incoming signal to node 441 over a second set of twisted wire pairs 443. Hub 440 will send an incoming signal to node 442 over a second set of twisted wire pairs 445. All nodes will then be allowed to make a request to send data for a time duration set by the protocol. Each node measures the time duration from the time the node receives the incoming signal from hub 440. Hub 440 will wait until all possible requests to transmit have been heard. Then, if there has been more than one request to transmit data, hub 440 will send the collision tone in place of the incoming tone. Otherwise, hub 440 will cease transmissions allowing the one node requesting data transmission to proceed with the transmission.

The method of transmitting data described above can be modified in order to reduce the possibility of undetectable errors occurring from noise bursts affecting all four channels simultaneously, and thereby corrupting several successive 5B/6B symbols propagating in parallel through the channels. In this modification 6B symbols on two channels are offset in time by half the time for transmission of a symbol, relative to the symbols on the remaining two channels. As a result a noise burst affecting the channels for the duration of transmission of up to four bits can corrupt at most six consecutive 5B symbols (thirty consecutive bits). Such corruption can always be detected using a 32-bit CRC code as described herein.

Various different 5B/6B block codes may be used in place of the block code given in Table 1 above. One possible alternative 5B/6B code is shown in Table 6 below.

TABLE 6

| | 5-bit data block | 6-bit code value | Alternate 6-bit code |
|---|---|---|---|
| 0 | 00000 | 000110 | 111001 |
| 1 | 00001 | 001110 | |
| 2 | 00010 | 110010 | |
| 3 | 00011 | 000111 | |
| 4 | 00100 | 100110 | |
| 5 | 00101 | 010011 | |
| 6 | 00110 | 100001 | 011110 |
| 7 | 00111 | 011000 | 100111 |
| 8 | 01000 | 110100 | |
| 9 | 01001 | 010110 | |
| 10 | 01010 | 000101 | 111010 |
| 11 | 01011 | 100011 | |
| 12 | 01100 | 110001 | |
| 13 | 01101 | 001001 | 110110 |
| 14 | 01110 | 011010 | |
| 15 | 01111 | 010101 | |
| 16 | 10000 | 010100 | 101011 |
| 17 | 10001 | 100100 | 011011 |
| 18 | 10010 | 100101 | |
| 19 | 10011 | 101010 | |
| 20 | 10100 | 001011 | |
| 21 | 10101 | 101001 | |
| 22 | 10110 | 101000 | 010111 |
| 23 | 10111 | 001010 | 110101 |
| 24 | 11000 | 011001 | |
| 25 | 11001 | 101100 | |
| 26 | 11010 | 010010 | 101101 |
| 27 | 11011 | 011100 | |
| 28 | 11100 | 100010 | 101110 |
| 29 | 11101 | 001100 | 110011 |
| 30 | 11110 | 001101 | |
| 31 | 11111 | 111000 | |

Accordingly, the disclosure of the present invention is intended to be illustrative, but not limiting, of the scope of the invention, which is set forth in the following claims.

We claim:

1. In a LAN in which a central hub is linked to each of a plurality of network nodes via a physical medium consisting of four pairs of unshielded-twisted pair (UTP) cable, a data transmission method of exchanging data packet signals, grouped as data octets, across the network at a data transmission rate of 100 Mb/s, the transmission method comprising the steps of:

(a) sequentially dividing said data octets into 5-bit data quintets;

(b) sequentially distributing said quintets into four serial code streams;

(c) sequentially scrambling each of said four serial code streams to produce four streams of randomized 5-bit quintets;

(d) sequentially block encoding each of said streams of randomized 5-bit quintets into 6-bit symbol data; and (e) transmitting said four streams of 6-bit symbol data across the network by transmitting each stream over one of said pairs of UTP cable.

2. A transmission method as in claim 1 further comprising the steps of:

(f) receiving said four streams of 6-bit symbol data;

(g) sequentially block decoding said 6-bit symbol data streams of each of said streams separately to recover said randomized 5-bit quintets;

(h) sequentially descrambling said randomized 5-bit quintets to recover said four serial code streams;

(i) sequentially demultiplexing said four serial code streams into a single data stream grouped in 5-bit data quintets; and (j) sequentially depacketizing said 5-bit quintets to recover said data octets.

3. A transmission method as in claim 1 wherein said transmitting step (e) includes staggering the transmission of data on two of said cable pairs relative to the transmission of data on the other two cable pairs by at least two data bits in time.

4. A transmission method as in claim 3 wherein said scrambling step (c) is performed differently on each serial code stream.

5. A transmission method as in claim 4 wherein said step (d) encoding is performed by encoding said randomized 5-bit quintets into 5B6B sextet symbols in such a way as to maintain DC balanced bit patterns on each of said four cable pairs.

6. A transmission method as in claim 1 wherein said scrambling step (c) is based on the following bit recurrence relation $$S[n] = S[n\text{-}9] \text{ XOR } S[n\text{-}11].$$

7. A transmission method as in claim 5 wherein said transmitting step (e) includes sequentially adding frame delimiters to each of said four streams for framing the data therein prior to transmission over the network.

8. A transmission method as in claim 7 wherein said transmitting step (e) is performed using binary NRZ modulation applied after sequentially adding frame delimiters to each of said four streams.

9. A method of transmitting a stream of data at a transmission rate of up to 100 Mb/s over a data network linking a central hub to a plurality of network nodes via a physical medium consisting of unshielded-twisted pair (UTP) wires, said data transmission method comprising the steps of:

(a) sequentially dividing said data stream into 5-bit data quintets;

(b) sequentially distributing said quintets into n serial code streams where $n \leq 4$;

(c) sequentially scrambling each of said n serial code streams to produce n randomized streams of 5-bit quintets;

(d) sequentially block encoding each of said randomized streams of 5-bit quintets into 6-bit symbol data; and (e) transmitting said n streams of 6-bit symbol data across the network by transmitting each of said n streams over one of said pairs of UTP cable while staggering by at least two data bits in time the transmission of data on at least one of said cable pairs relative to the transmission of data on the other cable pairs.

10. A transmission method as in claim 9 wherein $n=4$.

* * * * *